US012734806B2

(12) United States Patent
Nie et al.

(10) Patent No.: US 12,734,806 B2
(45) Date of Patent: Sep. 15, 2026

(54) MAINTENANCE DEVICE AND INKJET RECORDING APPARATUS

(71) Applicant: KYOCERA Document Solutions Inc., Osaka (JP)

(72) Inventors: Yiquan Nie, Osaka (JP); Takashi Somete, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 107 days.

(21) Appl. No.: 19/012,823

(22) Filed: Jan. 7, 2025

(65) Prior Publication Data

US 2025/0229537 A1 Jul. 17, 2025

(30) Foreign Application Priority Data

Jan. 11, 2024 (JP) ................................ 2024-002496

(51) Int. Cl.
*B41J 2/165* (2006.01)

(52) U.S. Cl.
CPC ................................ *B41J 2/16511* (2013.01)

(58) Field of Classification Search
CPC ..... B41J 2/16505; B41J 2/16511; B41J 2/165
See application file for complete search history.

(56) References Cited

U.S. PATENT DOCUMENTS 8,596,754 B2 12/2013 Taira
8,672,443 B2 3/2014 Hazeyama
8,807,701 B2 * 8/2014 Shinoda ............... B41J 2/16508 347/29
10,717,283 B2 * 7/2020 Shimizu .................. B41J 2/165
2012/0154474 A1 6/2012 Hazeyama
2012/0162311 A1 6/2012 Taira
2013/0002751 A1 1/2013 Shinoda
2022/0314612 A1 * 10/2022 Ueno .................. B41J 2/16508

FOREIGN PATENT DOCUMENTS

JP 2005-212138 A 8/2005
JP 2012-131064 A 7/2012
JP 2012-139904 A 7/2012
JP 2013-010300 A 1/2013

* cited by examiner

*Primary Examiner* — Jason S Uhlenhake
(74) *Attorney, Agent, or Firm* — Studebaker Brackett PLLC

(57) ABSTRACT

A maintenance device includes a cap, an air supply port, and a suppression member. The cap is attached to a nozzle surface of an inkjet head. The air supply port is provided in the cap. The suppression member is provided between the air supply port and the nozzle surface, and has a first gap from the air supply port and a second gap from the nozzle surface. The suppression member has one or more through-holes, and a recess. The through-holes are provided in a position not facing the air supply port of the suppression member, and penetrate from a side of the air supply port to a side of the nozzle surface. The recess is provided on an upper surface of the suppression member and recessed deeper than an edge portion of the through-hole.

8 Claims, 15 Drawing Sheets

MAINTENANCE DEVICE AND INKJET RECORDING APPARATUS

INCORPORATION BY REFERENCE

This application is based on and claims the benefit of priority from Japanese patent application No. 2024-002496 filed on Jan. 11, 2024, which is incorporated by reference in its entirety.

BACKGROUND

The present disclosure relates to a maintenance device which maintains an inkjet head and an inkjet recording apparatus.

In an inkjet recording apparatus using water-based ink, water evaporates from the ink in a nozzle during a period when printing is not performed, and viscosity of the ink is increased, and there is a risk that ejection failure or clogging occurs. Accordingly, a technique for suppressing the evaporation of water from the ink in the nozzle has been studied. For example, there is a device for supplying humidified air into a cap covering an ejection surface (a nozzle surface) of a head.

However, in the above-described device, since the humidified air is directly exposed to the nozzle surface, condensation may occur on the nozzle surface, and the ink may be pulled by the condensation and leave the nozzle. Further, although the humidified air is supplied from an air supply port provided in the cap, as the humidified air is further away from the air supply port, it becomes difficult for the humidified air to reach the nozzle surface, and the humidifying effect decreases. Therefore, there is a problem that an ejection performance becomes uneven and a density of an image deviates from image data.

SUMMARY

A maintenance device according to the present disclosure includes a cap, an air supply port, and a suppression member. The cap is attached to a nozzle surface of an inkjet head. The air supply port is provided in the cap. The suppression member is provided between the air supply port and the nozzle surface, and has a first gap from the air supply port and a second gap from the nozzle surface. The suppression member has one or more through-holes, and a recess. The through-holes are provided in a position not facing the air supply port of the suppression member, and penetrate from a side of the air supply port to a side of the nozzle surface. The recess is provided on an upper surface of the suppression member and recessed deeper than an edge portion of the through-hole.

An inkjet recording apparatus according to the present disclosure includes the inkjet head, and the maintenance device.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

[First Embodiment] Hereinafter, with reference to the drawings, an inkjet recording apparatus 1 according to a first embodiment of the present disclosure will be described.

Figure 1:
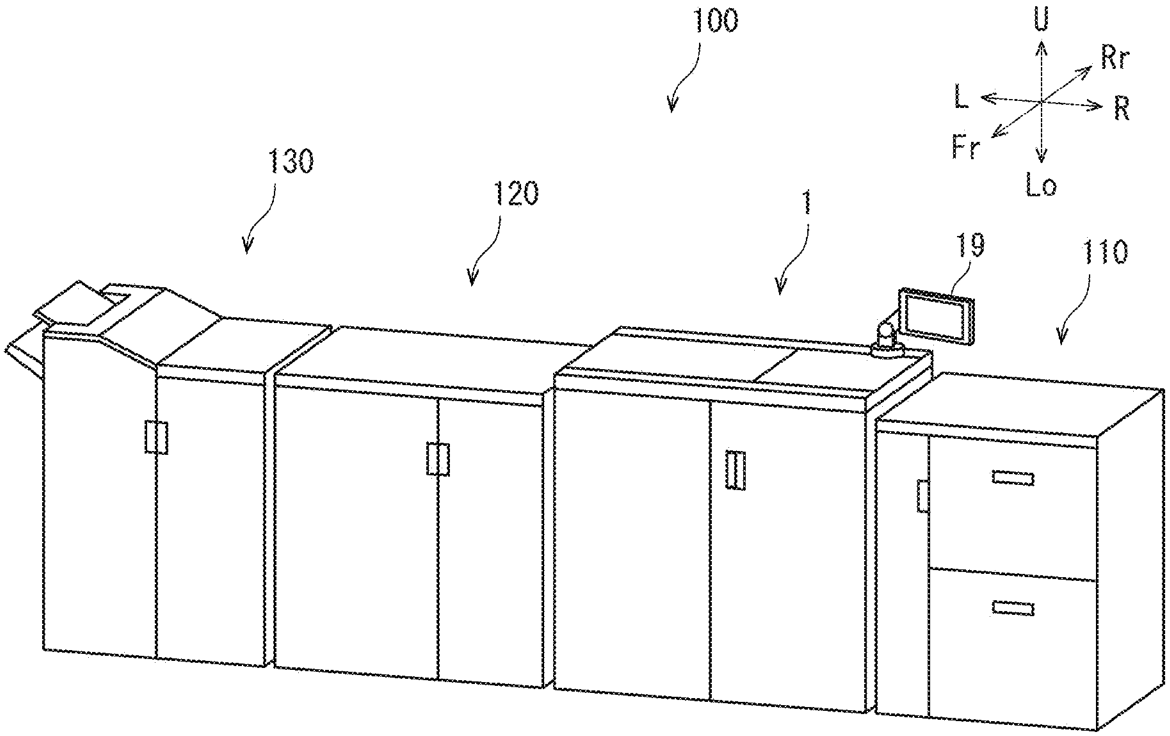
FIG. 1 is a perspective view showing an appearance of an image forming system according to a first embodiment of the present disclosure.
Figure 2:
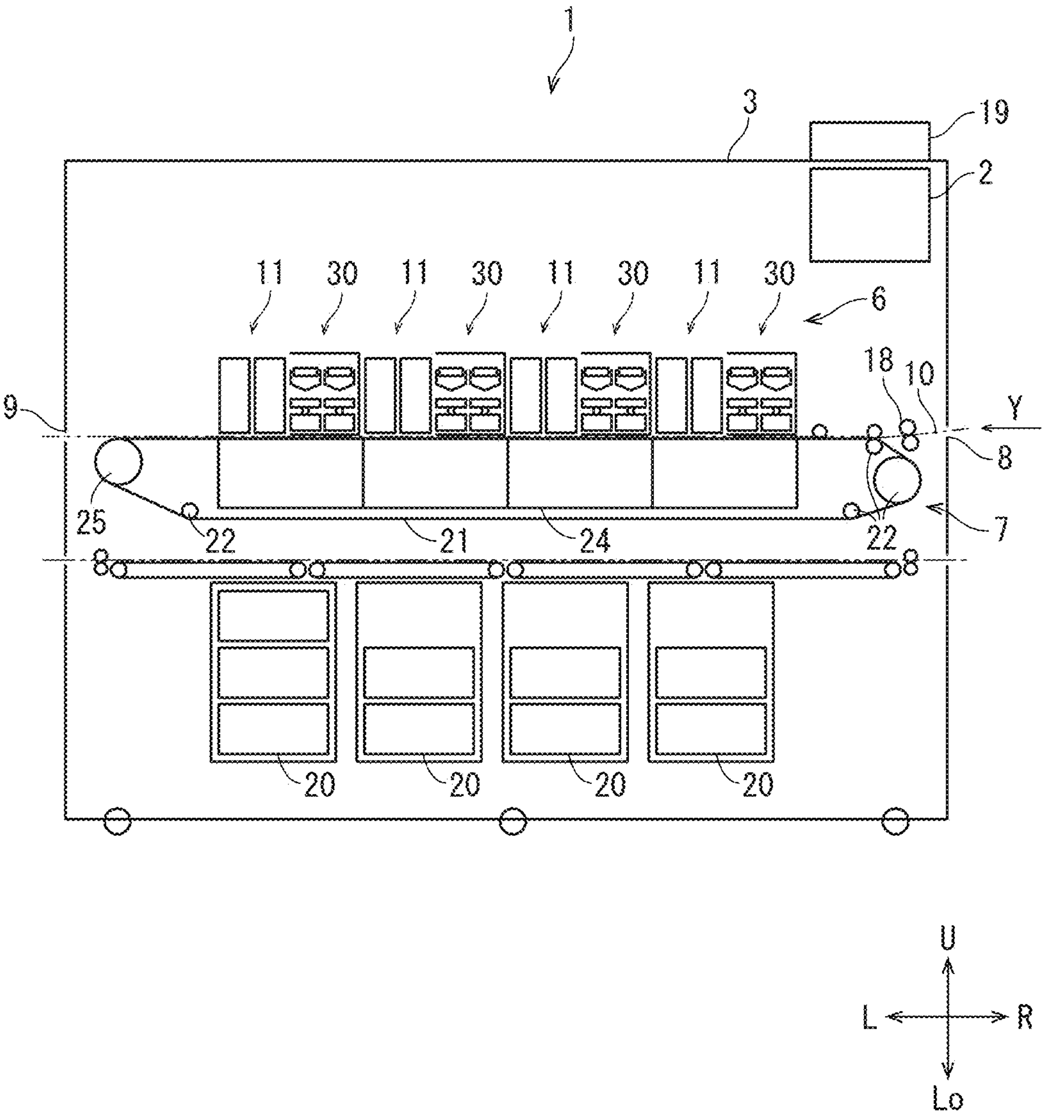
FIG. 2 is a front view schematically showing an internal structure of an inkjet recording apparatus according to the first embodiment of the present disclosure.
Figure 3:
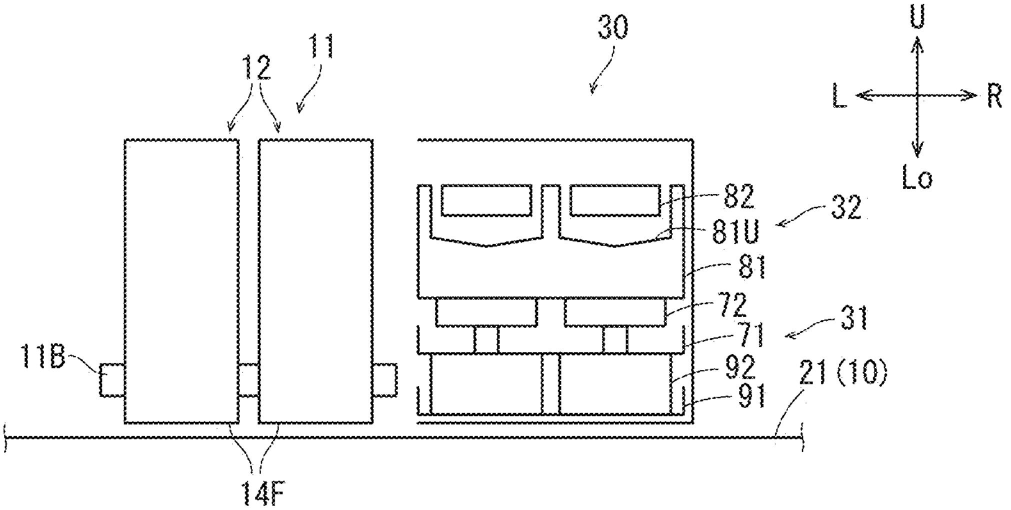
FIG. 3 is a front view schematically showing a head unit and a maintenance device according to the first embodiment of the present disclosure.
Figure 4:
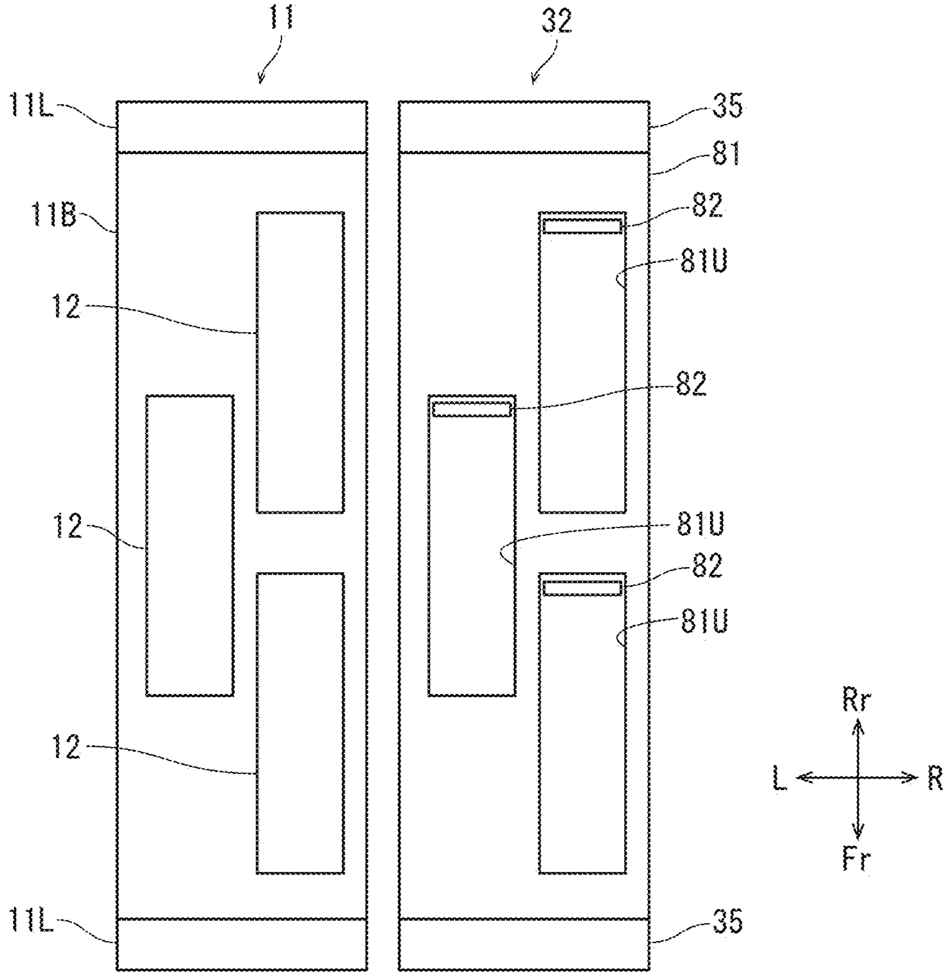
FIG. 4 is a plan view schematically showing the head unit and a wipe unit according to the first embodiment of the present disclosure.
Figure 5:
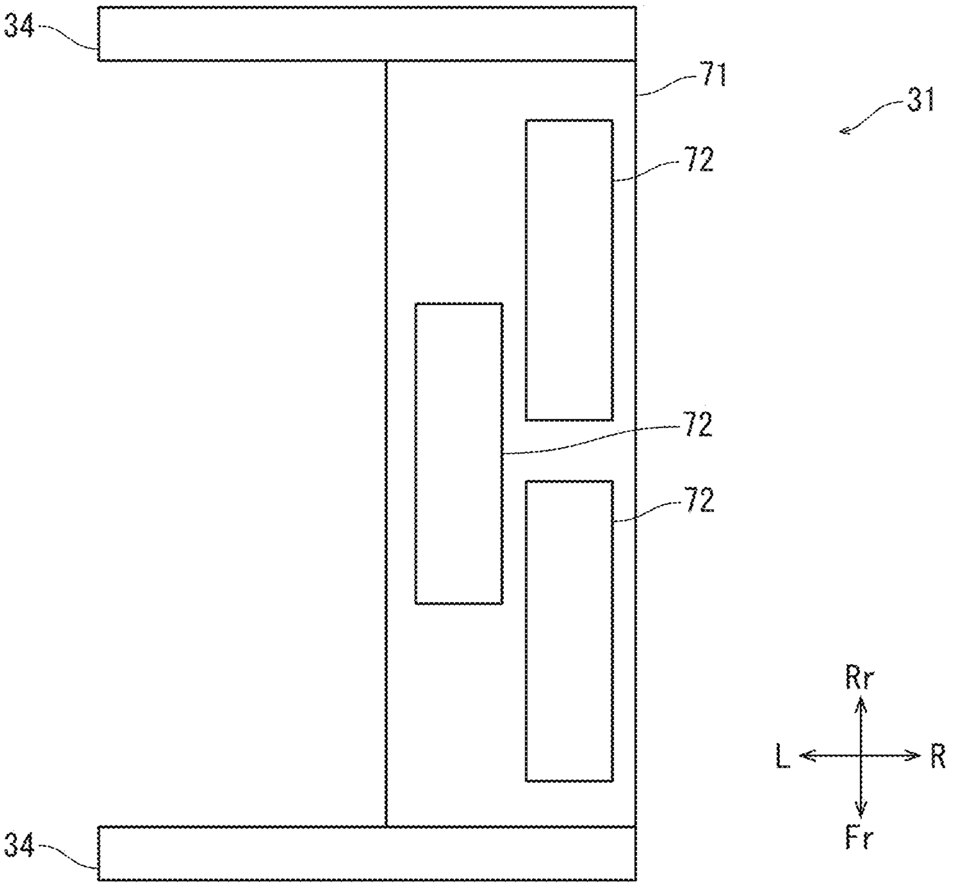
FIG. 5 is a plan view schematically showing a cap unit according to the first embodiment of the present disclosure.
Figure 6:
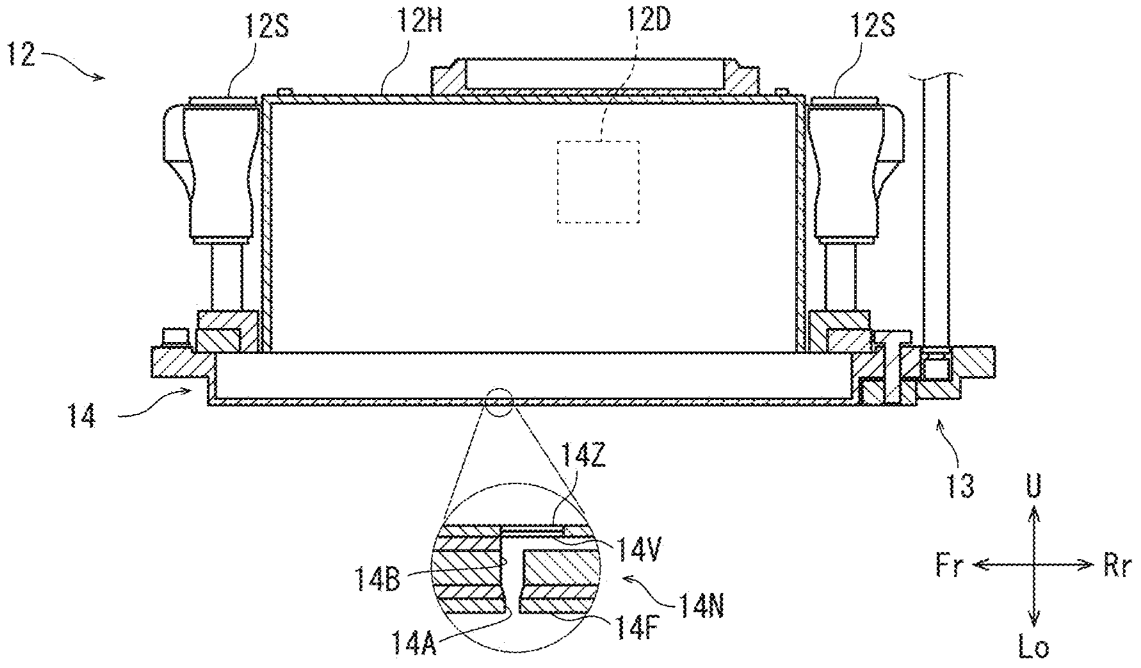
FIG. 6 is a cross-sectional view showing an inkjet head according to the first embodiment of the present disclosure.

FIG. 1 is a perspective view showing the appearance of the image forming system 100. FIG. 2 is a front view schematically showing an internal structure of the inkjet recording apparatus 1. FIG. 3 is a front view schematically showing a head unit 11 and a maintenance device 30. FIG. 4 is a plan view schematically showing the head unit 11 and a wipe unit 32. FIG. 5 is a plan view schematically showing a cap unit 31. FIG. 6 is a cross-sectional view showing an inkjet head 12. FIG. 7A to FIG. 7G are front views explaining an operation of the maintenance device 30. Hereinafter, the front side of the paper plane on which FIG. 2 is drawn will be referred to as the front side of the inkjet recording apparatus 1, and the left-and-right direction will be described with reference to the direction in which the inkjet recording apparatus 1 is viewed from the front side. In each figure, U, Lo, L, R, Fr, and Rr indicate an upper, lower, left, right, front, and rear, respectively.

The image forming system 100 (see FIG. 1) includes a sheet feeding device 110, an inkjet recording apparatus 1, a drying device 120, and a post-processing device 130. The sheet feeding device 110 stores several thousand sheets, and feeds the sheets to the inkjet recording apparatus 1. The inkjet recording apparatus 1 forms an image on the sheet by an inkjet method. The drying device 120 heats the sheet conveyed from the inkjet recording apparatus 1 to dry the ink. The post-processing device 130 performs post-processing such as punching, stapling, folding, or the like on the sheet conveyed from the drying device 120.

The inkjet recording apparatus 1 (see FIG. 2) includes a box-shaped body housing 3. In the center portion inside the body housing 3, a conveying unit 7 which attracts and conveys the sheet in the Y direction is provided. Above the conveying unit 7, an image forming unit 6 which forms an image by ejecting the ink is provided. On the right side surface of the body housing 3, a sheet feeding port 8 through which the sheet is introduced from the sheet feeding device 110 is provided. On the left side surface of the body housing 3, a discharge port 9 through which the sheet on which the image is formed is discharged to the drying device 120 is provided. Inside the body housing 3, a conveyance path 10 is provided from the sheet feeding port 8 to the discharge port 9 through a gap between the conveying unit 7 and the image forming unit 6. A registration roller 18 is provided on the upstream side of the conveying unit 7 in the conveyance direction Y.

The conveying unit 7 includes an endless conveying belt 21 and a suction part 24. The conveying belt 21 has a large number of air holes (not shown), and is wound around a driving roller 25 and a driven roller 22. The upper surface of the suction part 24 has a large number of air holes (not shown), and is in contact with the inner surface of the conveying belt 21. The suction part 24 sucks air through the air holes of the conveying belt 21 and the air holes of the suction part 24, thereby attracting the sheet to the conveying belt 21. When the driving roller 25 is driven in the counterclockwise direction by a driving part (not shown) including a motor and a reduction gear, the conveying belt 21 travels in the counterclockwise direction, and the sheet attracted to the conveying belt 21 is conveyed in the Y direction.

The image forming unit 6 includes a plurality (in this embodiment, four) of head units 11. The head unit 11 (see FIG. 3 and FIG. 4) includes one or more (in this embodiment, three) inkjet heads 12. Ink containers 20 filled with the black, cyan, magenta and yellow inks are connected to the head units 11.

The inkjet head 12 (see FIG. 6) includes a rectangular housing 12H whose longitudinal direction is along in the front-and-rear directions, a nozzle plate 14 provided at the bottom of the housing 12H, and a socket 12S to which a pipe for supplying the ink is connected. The nozzle plate 14 includes a large number of nozzles 14N arranged in the front-and-rear direction. The nozzle 14N includes a branch flow pass 14B branched from the downstream side of the socket 12S, and an ejection port 14A provided on a nozzle surface 14F which is a lower surface of the nozzle plate 14. A diaphragm 14V also serves as a part of the inner wall of the branch flow pass 14B. The diaphragm 14V is provided with a pressurizing element 14Z. As the pressurizing element 14Z, a piezoelectric element, an electrostatic actuator, a heater, or the like is used. A driving circuit 12D for driving the pressurizing element 14Z is connected to the pressurizing element 14Z.

The control part 2 (see FIG. 2) includes an arithmetic part and a storage part (not shown). The arithmetic part is, for example, a CPU (Central Processing Unit). The storage part includes a storage medium such as a ROM (Read Only Memory), a RAM (Random Access Memory), an EEPROM (Electrically Erasable Programmable Read Only Memory), and the like. The arithmetic part reads out the control program stored in the storage part and executes various processes. The control part 2 may be implemented by an integrated circuit that does not use software.

A display operation part 19 is provided on the upper portion of the body housing 3 (see FIG. 1 and FIG. 2). The display operation part 19 includes a display panel, a touch panel laminated on the display panel, and a keypad (not shown). The control part 2 displays a screen representing an operation menu, a status, or the like of the inkjet recording apparatus 1 on the display panel, and controls each part of the inkjet recording apparatus 1 in accordance with an operation detected by the touch panel and the keypad.

The basic image forming operation of the inkjet recording apparatus 1 is as follows. When an image forming job is inputted to the inkjet recording apparatus 1 from the display operation part 19 or an external computer, the sheet feeding device 110 feeds the sheet to the conveyance path 10 through the sheet feeding port 8, and the registration roller 18 whose rotation is stopped corrects the skew of the sheet. When the registration roller 18 sends the sheet to the conveying unit 7 at a predetermined timing, the conveying unit 7 attracts the sheet to the conveying belt 21 and conveys the sheet in the Y direction. The ink is ejected from the inkjet head 12 on the sheet to form an image on the sheet. The sheet on which the image is formed is discharged to the drying device 120 through the discharge port 9.

[Maintenance Device] Next, a maintenance device 30 will be described. Since the four head units 11 have the same configuration and the four maintenance devices 30 have the same configuration, one head unit 11 and one maintenance device 30 provided on the right side of the head unit 11 will be described below.

The head unit 11 includes a head base 11B (see FIG. 3 and FIG. 4) by which the inkjet head 12 is supported. On the head base 11B, the three inkjet heads 12 are arranged in a staggered pattern.

The maintenance device 30 (see FIG. 3) is provided on the lateral side (in this embodiment, the right side) of the head unit 11. The maintenance device 30 includes a cap unit 31 and a wipe unit 32.

[Cap Unit] The cap unit 31 (see FIG. 3 and FIG. 5) incudes caps 72 having the same number (in this embodiment, three) as the inkjet heads 12 provided in the head unit 11. The three caps 72 are arranged in a staggered pattern in the same manner as the inkjet heads 12. The three caps 72 are attached on the upper surface of a frame body 71 via pedestal portions 71M (see FIG. 8 to FIG. 11). Two caps 72 are arranged on the right side of the center in the left-and-right direction of the frame body 71 side by side in the front-and-rear direction, and one cap 72 is arranged on the left side. One left cap 72 is disposed at an intermediate position of the two right caps in the front-and-rear direction.

[Wipe Unit] The wipe unit 32 (see FIG. 3 and FIG. 4) includes a waste liquid tray 81 and a cleaning member 82. The waste liquid tray 81 has the same number of recesses 81U as the inkjet heads 12 provided in the head unit 11. The recesses 81U are arranged in a staggered pattern in the same manner as the inkjet heads 12. The cleaning member 82 is provided in each of the recesses 81U. The cleaning member 82 is, for example, a blade. The waste liquid tray 81 includes a driving part (not shown) for sliding the cleaning members 82 along the nozzle surfaces 14F. The waste liquid tray 81 is placed on the caps 72. In other words, the wipe unit 32 is placed on the cap unit 31. The head unit 11 is provided with a cleaning liquid supply device 13 (see FIG. 6) for supplying cleaning liquid to the nozzle surface 14F.

[Head Lifting Device] Head lifting devices 11L (see FIG. 4) are provided on the front and rear sides of the head base 11B, respectively. The head lifting device 11L includes, for example, a ball screw, a belt driving device, and the like. The head lifting devices 11L lift and lower the head unit 11 between an image forming position and a retracted position. The image forming position (see FIG. 7A) is a position where a distance between the conveyance path 10 (the upper surface of the conveying belt 21) on which the sheet S is conveyed and the nozzle surface 14F is a predetermined distance suitable for the image forming. The image forming position is the lower limit position of the lifting range of the head unit 11 by the head lifting devices 11L. The retracted position (see FIG. 7B) is a position where the head unit 11 does not interfere with the wipe unit 32 when the cap unit 31 and the wipe unit 32 are slid using a cap sliding device 34 described later. The retracted position is the upper limit position of the lifting range of the head unit 11.

[Cap Sliding Device] The cap sliding devices 34 (see FIG. 5) are provided on the front and rear sides of the frame body 71 of the cap unit 31, respectively. The cap sliding device 34 includes, for example, a ball screw, a belt driving device, and the like. The cap sliding devices 34 slide the cap unit 31 to a home position and a maintenance position. The home position (see FIG. 7A) is a position on the right side of the head unit 11 positioned at the image forming position. The maintenance position (see FIG. 7F) is a position below the head unit 11 positioned at the retracted position.

[Wipe Lifting Device] Wipe lifting devices 35 (see FIG. 4) are provided on the front and rear sides of the waste liquid tray 81 of the wipe unit 32, respectively. The wipe lifting device 35 includes, for example, a ball screw, a belt driving device, and the like. The wipe lifting devices 35 lift and lower the wipe unit 32 to a contact position (see FIG. 7B) where the waste liquid tray 81 comes into contact with the caps 72 and a separated position (see FIG. 7E) where the waste liquid tray 81 is separated from the caps 72 by a predetermined distance.

Figure 8:
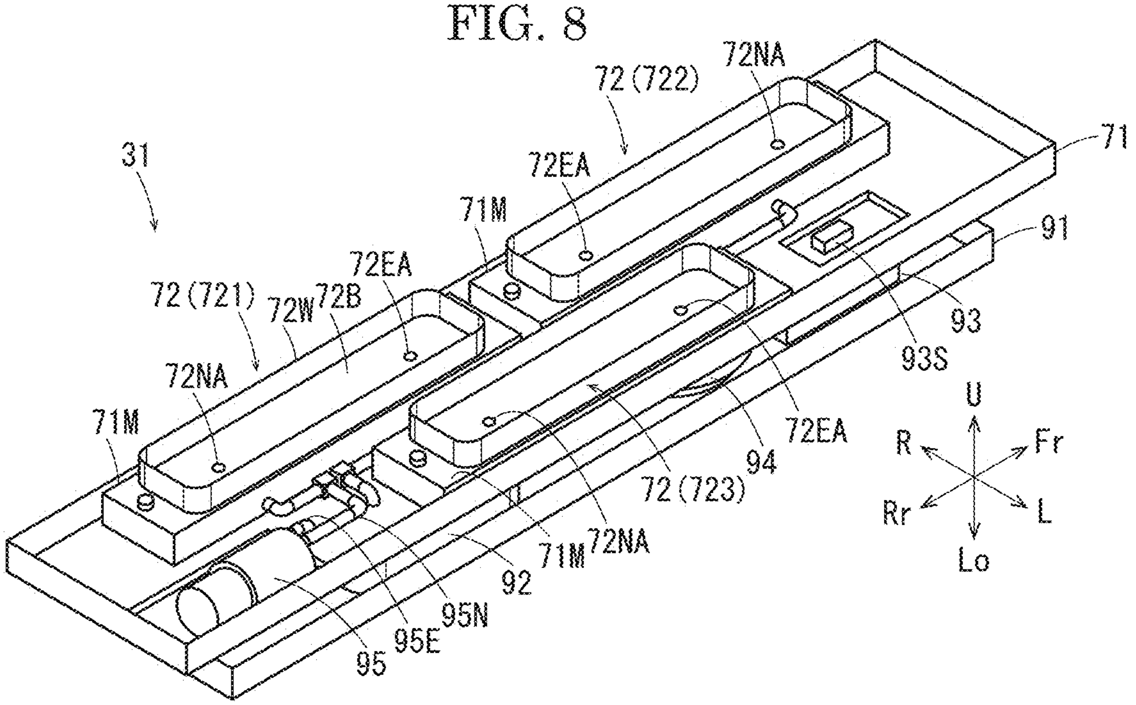
FIG. 8 is a perspective view showing the cap unit according to the first embodiment of the present disclosure.
Figure 9:
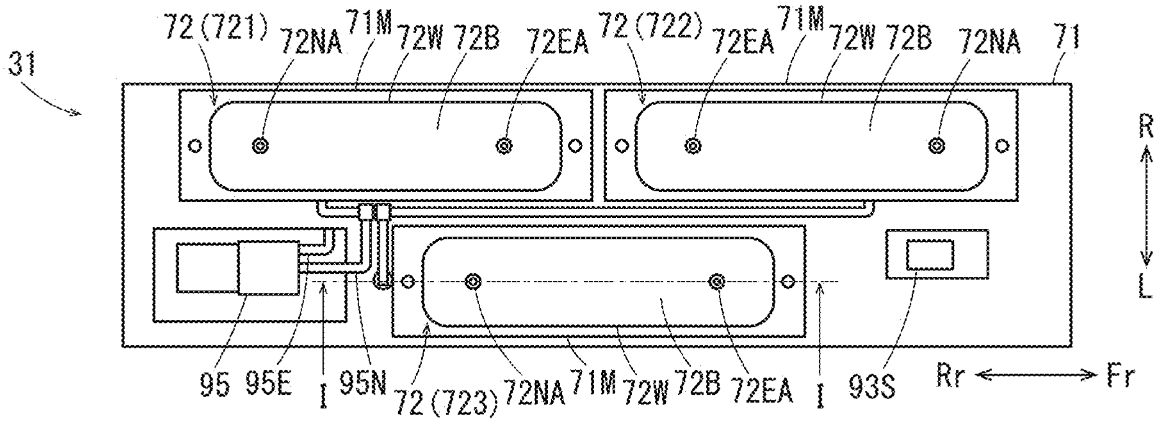
FIG. 9 is a plan view showing the cap unit according to the first embodiment of the present disclosure.
Figure 10:
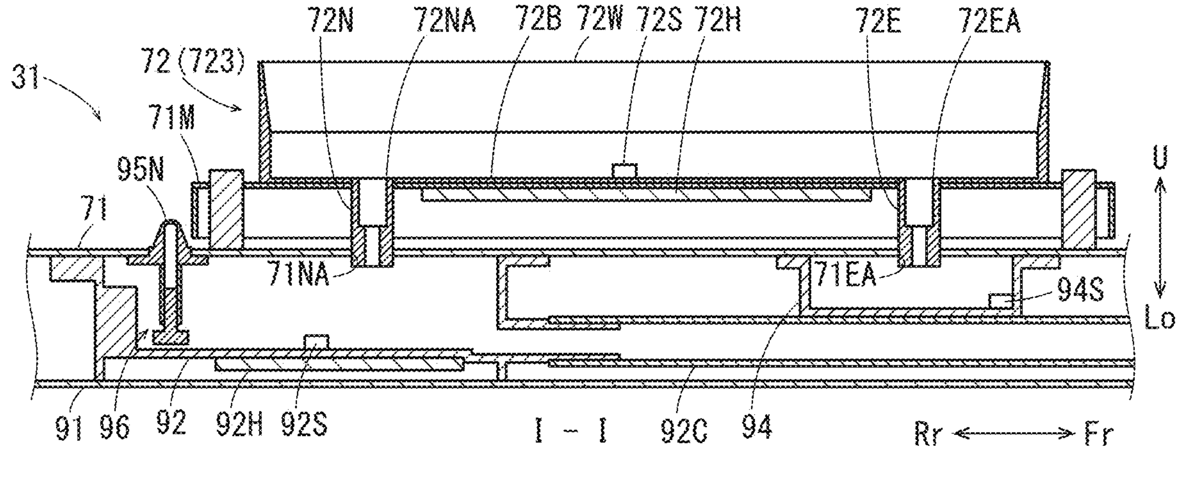
FIG. 10 is a cross-sectional view taken along the line I-I of FIG. 9.
Figure 11:
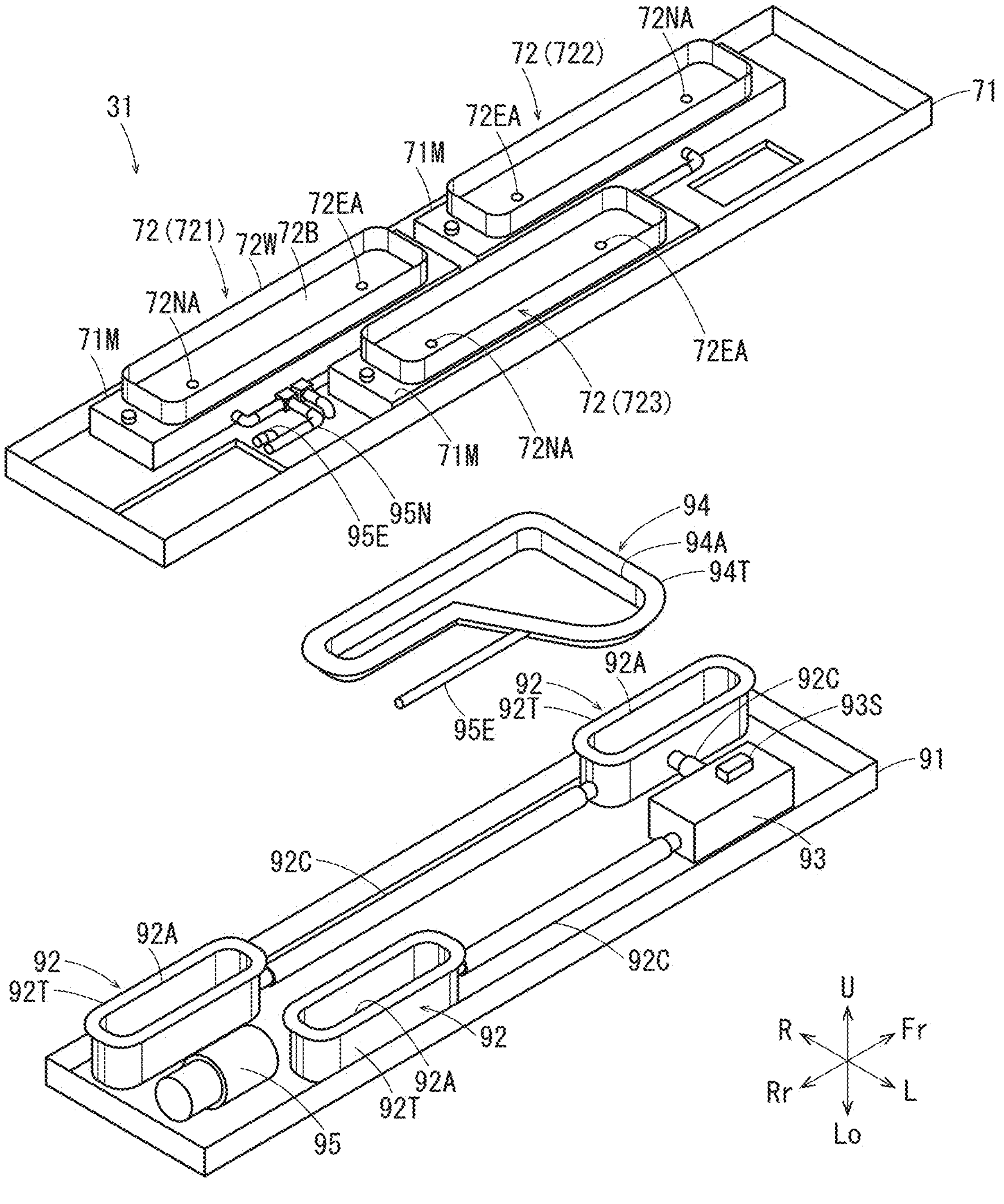
FIG. 11 is a disassembled view showing the cap unit according to the first embodiment of the present disclosure.
Figure 12:
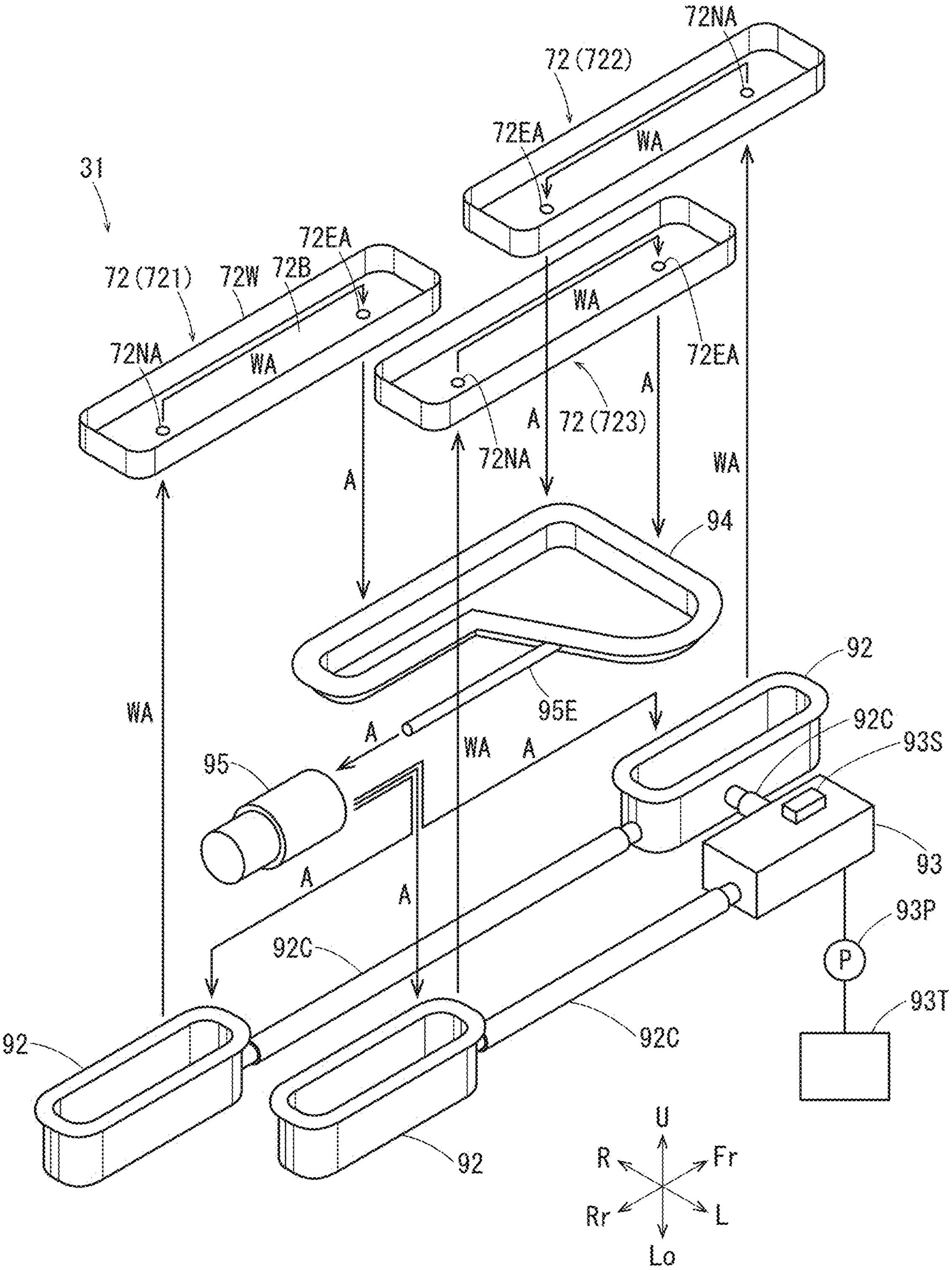
FIG. 12 is a view explaining a flow of air and humidified air in the cap unit according to the first embodiment of the present disclosure.
Figure 13:
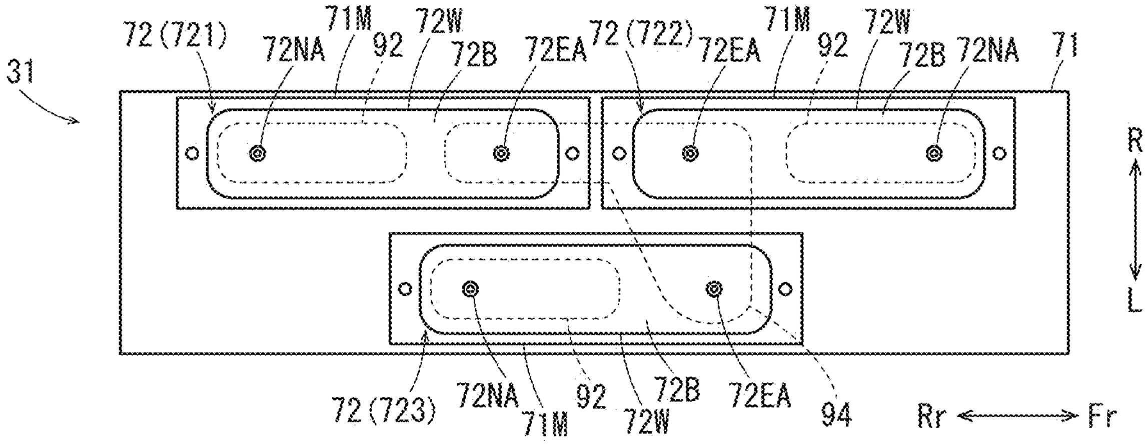
FIG. 13 is a plan view showing positions of a supply part and a recovery part according to the first embodiment of the present disclosure.
Figure 14:
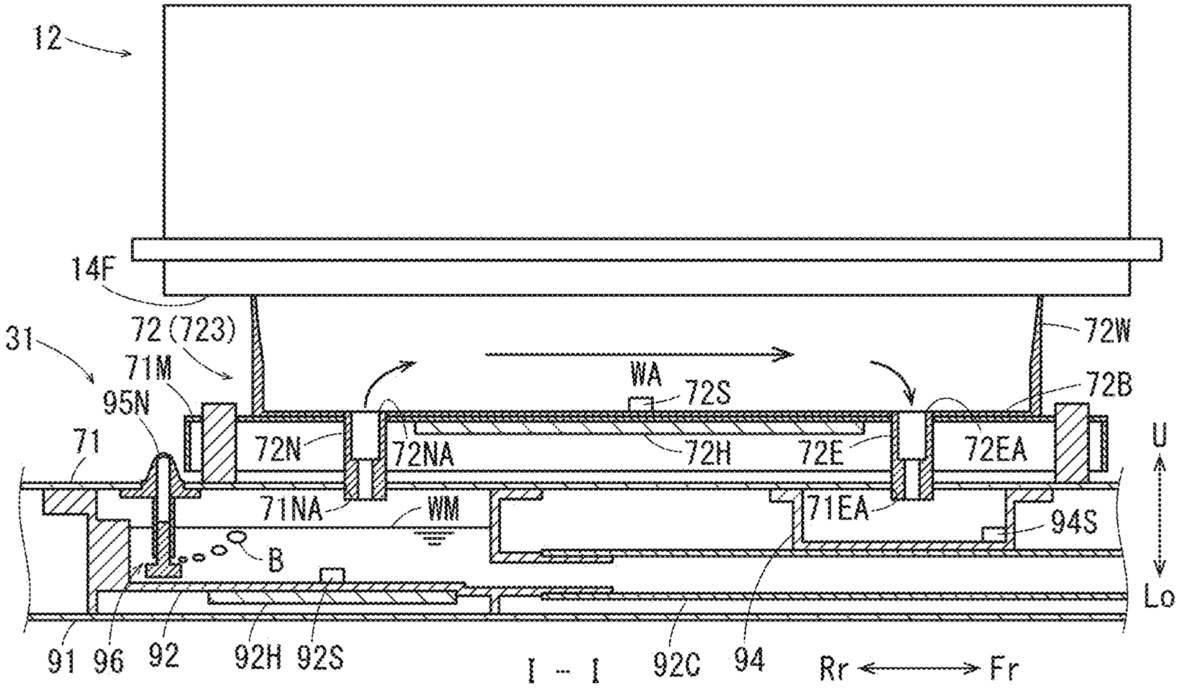
FIG. 14 is a cross-sectional view explaining a flow of humidified air in the cap according to the first embodiment of the present disclosure.

Next, a configuration of the cap unit 31 will be described in detail. FIG. 8 is a perspective view showing the cap unit 31. FIG. 9 is a plan view showing the cap unit 31. FIG. 10 is a cross-sectional view taken along the line I-I in FIG. 9. FIG. 11 is a disassembled view showing the cap unit 31. FIG. 12 is a diagram explaining a flow of a humidified air WA in the cap unit 31. FIG. 13 is a plan view showing positions of a supply part 92 and a recovery part 94. FIG. 14 is a cross-sectional view explaining a flow of a humidified air WA in the cap 72.

The maintenance device 30 according to the embodiment includes a plurality of the caps 72 attached on the nozzle surfaces 14F of the inkjet heads 12, an air supply port 72NA and an air discharge port 72EA which are provided in each of the caps 72, one recovery part 94 which recovers air A through the air discharge ports 72EA of all the caps 72, and a plurality of supply parts 92 which are provided for the caps 72 and supply humidified air WA generated by humidifying the air A recovered by the recovery part 94, to the air supply ports 72NA. The supply parts 92 are arranged around the recovery part 94. In each of the caps 72, the air discharge port 72EA is provided on a side of the recovery part 94, and the air supply port 72NA is provided on a side of the supply part 92.

The caps 72 include a first cap 721, a second cap 722, and a third cap 723. The first cap 721 and the second cap 722 are arranged along a predetermined direction (for example, in the front-and-rear direction), the third cap 723 is arranged at an intermediate position between the first cap 721 and the second cap 722 in the predetermined direction, and is arranged at a position different from the first cap 721 and the second cap 722 in a direction intersecting the predetermined direction. The air discharge port 72EA of the first cap 721 is provided on a side of the second cap 722, and the air discharge port 72EA of the second cap 722 is provided on a side of the first cap 721.

[Cap] The cap 72 (see FIG. 8 to FIG. 10) is formed in the box-shape opened upwardly. The cap 72 includes a generally rectangular bottom portion 72B whose longitudinal direction is along the front-and-rear direction, and a side wall portion 72W standing upwardly from the edge of the bottom portion 72B. The side wall portion 72W is made of material having flexibility such as rubber. The bottom portion 72B is provided with the air supply port 72NA and the air discharge port 72EA. In the right rear cap 72 and the left cap 72, the air supply port 72NA is provided on the rear side, and the air discharge port 72EA is provided on the front side. In the right front cap 72, the air supply port 72NA is provided on the front side, and the air discharge port 72EA is provided on the rear side.

The three caps 72 are arranged in a staggered pattern. The first cap 721 is arranged on the right rear portion on the frame body 71, the second cap 722 is arranged in front of the first cap 721, and the third cap 723 is arranged on the left side portion on the frame body 71. In the first cap 721 and the third cap 723, the air discharge port 72EA is provided on the front side, and the air supply port 72NA is provided on the rear side. In the second cap 722, the air discharge port 72EA is provided on the rear side, and the air supply port 72NA is provided on the front side. In the second cap 722, the air discharge port 72EA may be provided on the front side and the air supply port 72NA may be provided on the rear side.

[Supply Part, Recovery Part] Below the frame body 71 (see FIG. 8, FIG. 11 to FIG. 13), the supply parts 92 of the same number as the caps 72 (in this embodiment, three) and one recovery part 94 are provided. The supply part 92 includes a tank 92T. The recovery part 94 includes a tank 94T. The supply parts 92 and the recovery part 94 are supported by a frame body 91. The supply parts 92 are arranged below the air supply ports 72NA of the corresponding caps 72. The recovery part 94 has a shape overlapping all the air discharge ports 72EA in a plan view, and is arranged below all the air discharge ports 72EA.

In other words, the three supply parts 92 are arranged around one recovery part 94, and in each of the three caps 72, the air discharge port 72EA is provided on a side of the recovery part 94, and the air supply port 72NA is provided on a side of the supply part 92. In other words, all the air discharge ports 72EA overlap the recovery part 94 in the upper-and-lower direction, and in each of the caps 72, the air supply port 72NA overlaps the supply part 92 in the upper-and-lower direction.

The tank 92T has an opening 92A opened upward (see FIG. 11). The tank 94T has an opening 94A opened upward. The tank 92T and the tank 94T are joined on the lower surface of the frame body 71. That is, the opening 92A and the opening 94A are closed with the frame body 71. In other words, the frame body 71 serves as the ceilings of the tank 92T and the tank 94T.

An air supply pipe 72N (see FIG. 10) is connected to the air supply port 72NA of each of the caps 72 so as to communicate the cap 72 with the supply part 92 below the corresponding cap 72. An air discharge pipe 72E is connected to the air discharge port 72EA of each of the caps 72 so as to communicate the cap 72 with the recovery part 94. That is, the three caps 72 communicate with the recovery part 94.

The air pump 95 is connected to the recovery part 94 by a recovery flow pass 95E (see FIG. 8, FIG. 9 and FIG. 11), and is connected to all the supply parts 92 by a supply flow pass 95N. The air pump 95 recovers the air A having a decreased water vapor pressure from the recovery part 94 through the recovery flow pass 95E, and supplies the recovered air A to all the supply parts 92 through the supply flow pass 95N (see FIG. 12).

All the supply parts 92 are connected to the sub-tank 93 through communication pipes 92C (see FIG. 10, FIG. 11 and FIG. 12). A tank 93T and a pump 93P are connected to the sub-tank 93. A humidifying medium WM (see FIG. 14) is stored in the tank 93T. The humidifying medium WM is, for example, water, but any liquid containing water may be used. The pump 93P supplies the humidifying medium WM from the tank 93T to the sub-tank 93.

The sub-tank 93 is provided with a sensor 93S (see FIG. 8, FIG. 9, FIG. 11 and FIG. 12) for detecting an amount of the humidifying medium WM in the sub-tank 93. The sensor 93S detects, for example, a height of the liquid level in the sub-tank 93. The supply part 92 is provided with a first heating part 92H (see FIG. 10) for heating the supply part 92. The cap 72 is provided with a second heating part 72H for heating the cap 72. The supply part 92 is provided with a sensor 92S for measuring a temperature in the supply part 92. The cap 72 is provided with a sensor 72S for measuring a temperature in the cap 72. The recovery part 94 is provided with a sensor 94S for measuring at least one of a temperature and a humidity in the recovery part 94.

Next, the basic operation of the maintenance device 30 will be described. In the initial state (see FIG. 7A), the head unit 11 is positioned at the image forming position and the cap unit 31 is positioned at the home position. The wipe unit 32 is placed on the cap unit 31. That is, the waste liquid tray 81 is in contact with the caps 72. The control part 2 executes the following processing at a predetermined timing. The predetermined timing is, for example, a timing in which a viscosity of the ink in the nozzle 14N is expected to increase, and more specifically, a case in which a period in which the image forming job is not executed continues for a predetermined period.

Figure 7A:
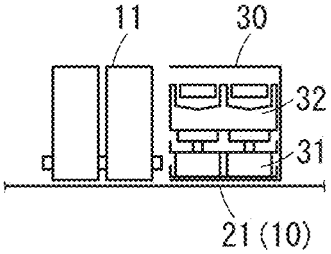
FIG. 7A to FIG. 7G are front views explaining an operation of the maintenance device according to the first embodiment of the present disclosure.
Figure 7B:
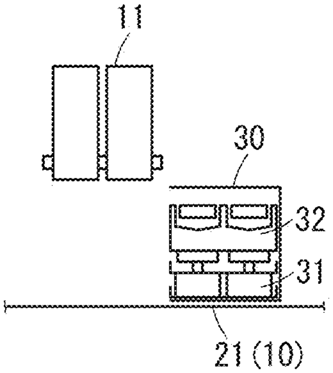

First, the control part 2 operates the head lifting devices 11L to lift the head unit 11 to the retracted position (see FIG. 7B). Next, the control part 2 operates the cap sliding devices 34 to slide the cap unit 31 to the maintenance position (see FIG. 7C). At this time, since the wipe unit 32 is placed on the cap unit 31, the wipe unit 32 slides to the maintenance position together with the cap unit 31. Next, the control part 2 operates the head lifting devices 11L to lower the head unit 11 to a height at which the nozzle surface 14F comes into contact with the cleaning member 82 (see FIG. 7D).

Next, the control part 2 forcibly ejects a predetermined amount of the ink from the inkjet head 12 (purge processing), supplies the cleaning liquid to the nozzle surface 14F, and slides the cleaning member 82 along the nozzle surface 14F (wiping processing). Then, the ink remaining on the nozzle surface 14F is diluted by the cleaning liquid, and the waste liquid containing the ink and the cleaning liquid is scraped off by the cleaning member 82 and falls on the waste liquid tray 81.

Figure 7C:
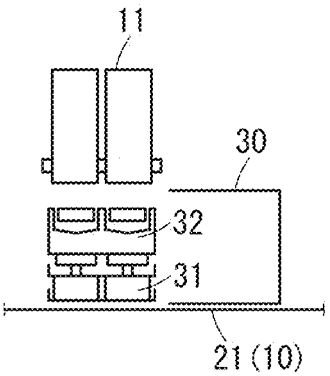
Figure 7D:
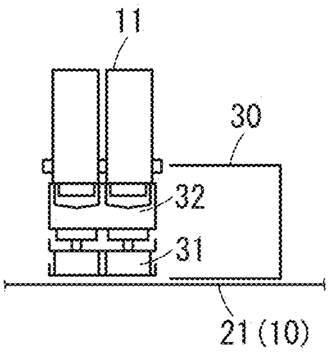

Next, the control part 2 operates the head lifting devices 11L to lift the head unit 11 to the retracted position (see FIG. 7C). Next, the control part 2 operates the cap sliding devices 34 to slide the cap unit 31 and the wipe unit 32 to the home position (see FIG. 7B).

Figure 7E:
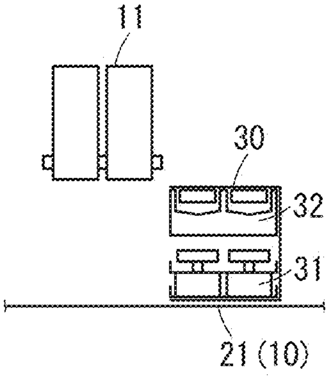
Figure 7F:
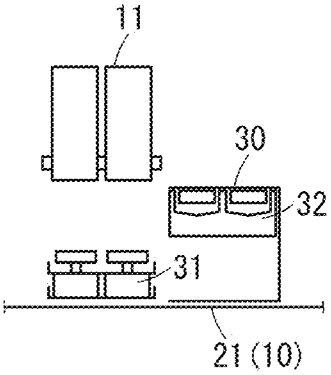

Next, the control part 2 operates the wipe lifting devices 35 to lift the wipe unit 32 to the separated position (see FIG. 7E). Next, the control part 2 operates the cap sliding devices 34 to slide the cap unit 31 to the maintenance position (see FIG. 7F). At this time, since the wipe unit 32 is separated from the cap unit 31, the wipe unit 32 remains at the home position and only the cap unit 31 slides to the maintenance position.

Figure 7G:
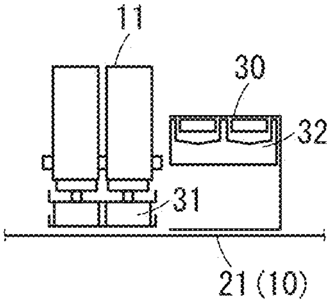

Next, the control part 2 operates the head lifting devices 11L to lower the head unit 11 to a height at which the nozzle surface 14F comes into contact with the cap 72 (see FIG. 7G). Thus, the cap 72 is attached on the nozzle surface 14F.

Next, the control part 2 humidifies the inside of the cap 72. The control part 2 monitors the measured value by the sensor 93S and maintains a height of the liquid level in the sub-tank 93 within a predetermined range. Specifically, when the measured value of the liquid level is lowered than the predetermined range, a predetermined amount of the humidifying medium WM is replenished from the tank 93T to the sub-tank 93 by using the pump 93P. Since the sub-tank 93 communicates with the supply parts 92 by the communication pipes 92C, a height of the liquid level of the humidifying medium WM is uniform in the sub-tank 93 and all the supply parts 92.

The air pump 95 (see FIG. 12) recovers the air A having a decreased water vapor pressure from the recovery part 94 through the recovery flow pass 95E, and supplies the recovered air A to all the supply parts 92 through the supply flow pass 95N. An end portion of the supply flow pass 95N on a side of the supply part 92 is disposed below the liquid level of the humidifying medium WM (see FIG. 14). Therefore, the air A is blown into the humidifying medium WM in the supply part 92, and bubbles B are generated. A water vapor pressure of the bubbles B increases until the bubbles B float upward to the liquid surface. In addition, since the humidifying medium WM in the supply part 92 is heated by the first heating part 92H, water vapor is easily generated. Therefore, a space above the liquid level in the supply part 92 is filled with the humidified air WA having an increased water vapor pressure, and the humidified air WA flows into the cap 72 through the air supply pipe 72N. The air pump 95 may recover and supply the air A continuously or intermittently.

On the other hand, since the air A in the recovery part 94 is sucked by the air pump 95, a negative pressure is generated in the recovery part 94. Therefore, an air flow of the humidified air WA from the air supply port 72NA to the air discharge port 72EA is generated in the cap 72. In addition, since the humidified air WA supplied to the cap 72 is heated by the first heating part 92H, convection is generated in the cap 72, and the high-temperature humidified air WA is supplied to the nozzle surface 14F. Thus, the humidified air WA is exposed to the ink in the nozzles 14N, and the viscosity increase of the ink is suppressed.

In addition to the above control, the control part 2 executes temperature control of each part. Specifically, each of the inkjet heads 12 is provided with a sensor (not shown) for measuring a temperature of the inkjet head 12 (for example a temperature of the ink in the nozzle 14N). As described above, the supply part 92 is provided with the first heating part 92H (see FIG. 10) for heating the supply part 92. The cap 72 is provided with the second heating part 72H for heating the cap 72. The supply part 92 is provided with the sensor 92S for measuring a temperature in the supply part 92. The cap 72 is provided with the sensor 72S for measuring a temperature in the cap 72. The recovery part 94 is provided with the sensor 94S for measuring at least one of a temperature and a humidity in the recovery part 94.

The control part 2 monitors the measured value by the sensor 92S, and controls the first heating part 92H so that a temperature of the supply part 92 is equal to or higher than a temperature of the inkjet head 12. If a temperature of the supply part 92 is less than a temperature of the inkjet head 12, there is a possibility that a humidity of the humidified air WA supplied from the supply part 92 becomes lower than that in the nozzle 14N of the inkjet head 12, and in this case, a humidifying effect on the ink in the nozzle 14N cannot be obtained. On the other hands, in the present embodiment, the humidified air WA having a higher humidity than that in the nozzle 14N of the inkjet head 12 is supplied.

The control part 2 monitors the measured value by the sensor 72S, and controls the second heating part 72H so that a temperature of the cap 72 is equal to or higher than a temperature of the supply part 92. If a temperature of the cap 72 is less than a temperature of the supply part 92, a temperature of the humidified air WA supplied from the supply part 92 is lowered in the cap 72. If a temperature of the humidified air WA is lower than the dew point, dew condensation occurs, and a humidity in the cap 72 is decreased, and the humidifying effect cannot be obtained. On the other hand, in the present embodiment, since a temperature of the humidified air WA does not decrease in the cap 72, there is no possibility that a humidity in the cap 72 decreases due to the dew condensation.

When the image forming job is executed, the control part 2 operates the head lifting devices 11L to lift the head unit 11 to the retracted position (see FIG. 7F), operates the cap sliding devices 34 to slide the cap unit 31 to the home position (see FIG. 7E), and operates the wipe lifting devices 35 to lower the wipe unit 32 to the contact position (see FIG. 7B). Then, the control part 2 operates the head lifting devices 11L to lower the head unit 11 to the image forming position and executes the image forming job.

By the way, since the humidified air WA flowing into the cap 72 through the air supply pipe 72N rises toward the nozzle surface 14F, the humidified air WA is directly exposed to the nozzle surface 14F, and in such a case, there is a possibility that a condensation is generated on the nozzle surface 14F, and the ink is pulled by the condensation and leaves the nozzle 14N. In addition, the ink in the nozzle 14N may vibrate due to the flow of the humidified air WA, and the ink may fall. The fallen ink may be deposited in the cap 72 and obstruct the flow of the humidified air WA or clog the air supply pipe 72N.

Figure 15:
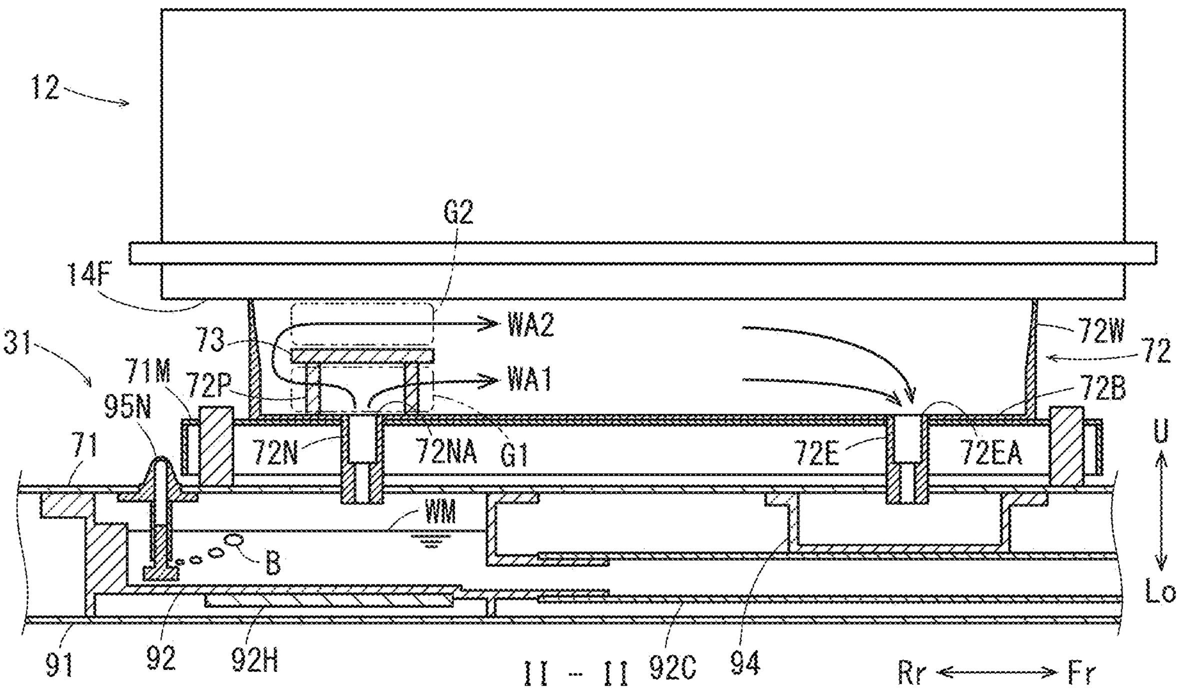
FIG. 15 is a cross-sectional view showing the cap unit provided with a suppression member according to the first embodiment of the present disclosure.
Figure 16:
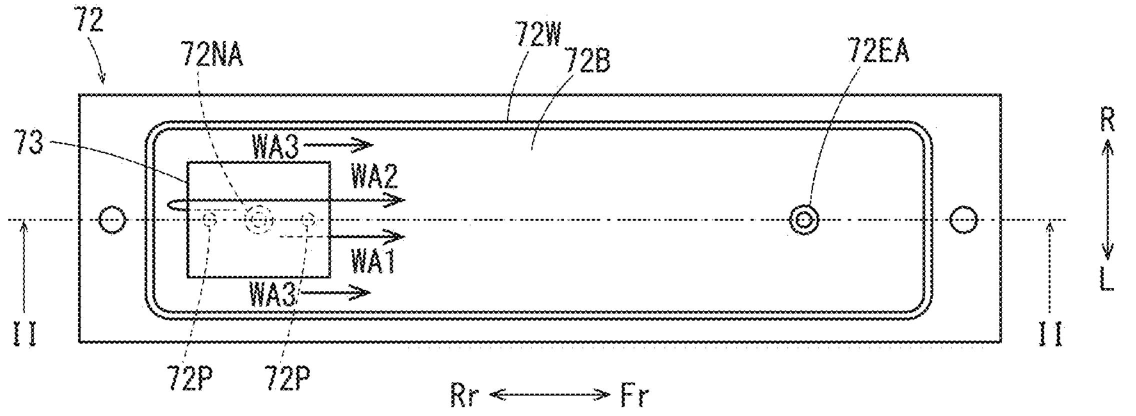
FIG. 16 is a plan view showing the cap provided with the suppression member according to the first embodiment of the present disclosure.

Therefore, the maintenance device 30 according to the present embodiment includes a suppression member 73. FIG. 15 is a cross-sectional view showing the cap unit 31 provided with the suppression member 73. FIG. 16 is a plan view showing the cap 72 provided with the suppression member 73. FIG. 15 is a cross-sectional view taken along the line II-II in FIG. 16.

The maintenance device 30 according to the present embodiment includes the cap 72 attached on the nozzle surface 14F of the inkjet head 12, the air supply port 72NA provided in the cap 72, and the suppression member 73 provided at least between the air supply port 72NA and the nozzle surface 14F, having a first gap G1 from the air supply port 72NA and a second gap G2 from the nozzle surface 14F. Specifically, they are as follows.

The suppression member 73 is provided above the air supply port 72NA. The suppression member 73 is a plate-like member whose thickness direction is along the upper-and-lower direction, and is made of resin. The suppression member 73 is supported by posts 73P provided on the bottom portion 72B of the cap 72. A dimension of the suppression member 73 in the front-and-rear direction and the left-and-right direction is larger than that of the air supply port 72NA. The suppression member 73 is provided so as to cover at least the entire air supply port 72NA in a plan view. The first gap G1 is provided between the air supply port 72NA and the lower surface of the suppression member 73. The second gap G2 is provided between the nozzle surface 14F and the upper surface of the suppression member 73.

A part WA1 (see FIG. 15) of the humidified air flowing into the cap 72 from the air supply port 72NA flows forward from the first gap G1, and is sucked into the air discharge port 72EA. Another part WA2 of the humidified air flows from the first gap G1 to the second gap G2 via the rear side of the suppression member 73, flows forward from the second gap G2, and is sucked into the air discharge port 72EA. Another part of the humidified air WA3 (see FIG. 16) flows forward from the left and right spaces of the suppression member 73, and is sucked into the air discharge port 72EA. That is, since the humidified air WA flows along the lower and upper surfaces of the suppression member 73 above the air supply port 72NA, the humidified air WA is not directly exposed to the nozzle surface 14F above the air supply port 72NA. As a result, the generation of condensation on the nozzle surface 14F is suppressed, and the ink is prevented from being pulled by the condensation and leaving the nozzle 14N.

The reason why the suppression member 73 is made of resin is as follows. The condensation may occur in the suppression member 73 when the suppression member 73 takes heat away from the humidified air WA. In particular, in the present embodiment, since the first heating part 92H is provided in the supply part 92 in order to increase an amount of water vapor in the humidified air WA, the condensation tends to occur. When the condensation occurs, the water vapor pressure of the humidified air WA decreases, thereby reducing the humidifying effect on the ink in the nozzle 14N. To suppress the condensation, it is desirable to made the suppression member 73 of material having a low thermal conductivity. In general, since resin has a lower thermal conductivity than metal, it is suitable as the material for the suppression member 73.

The maintenance device 30 according to the present embodiment described above includes the cap 72 attached on the nozzle surface 14F of the inkjet head 12, the air supply port 72NA provided in the cap 72, and the suppression member 73 provided at least between the air supply port 72NA and the nozzle surface 14F, having the first gap G1 from the air supply port 72NA and the second gap G2 from the nozzle surface 14F. According to this embodiment, it is possible to prevent the humidified air WA from directly exposed to the nozzle surface 14F.

According to the maintenance device 30 according to the present embodiment, the suppression member 73 is made of resin. According to this embodiment, the condensation of the humidified air WA can be suppressed.

The inkjet recording apparatus according to the present embodiment includes the inkjet head 12 and the maintenance device 30. According to the present embodiment, the increase in the viscosity of the ink in the nozzle 14N of the inkjet head 12 can be suppressed.

Figure 17:
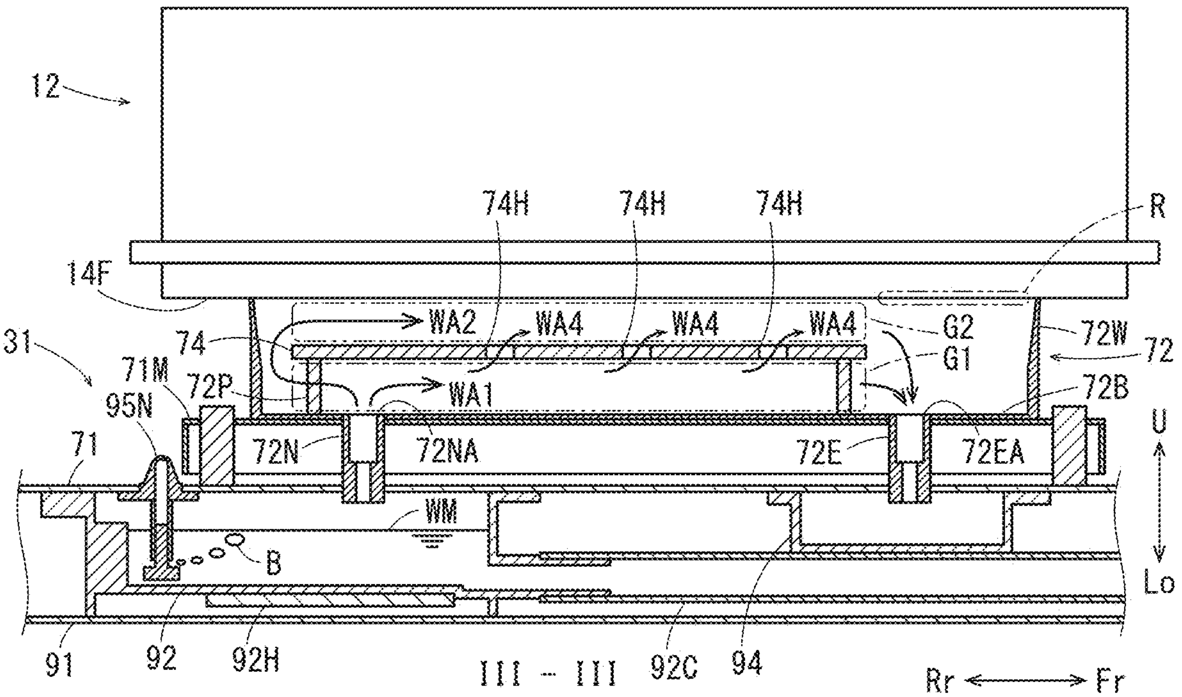
FIG. 17 is a cross-sectional view showing the cap unit provided with the suppression member according to a second embodiment of the present disclosure.
Figure 18:
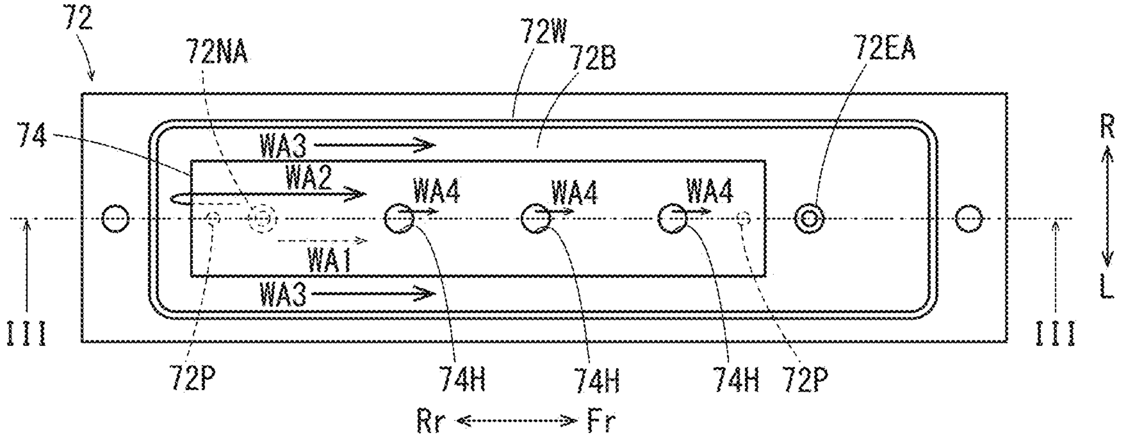
FIG. 18 is a plan view showing the cap provided with the suppression member according to the second embodiment of the present disclosure.

[Second Embodiment] FIG. 17 is a cross-sectional view showing the cap unit 31 provided with the suppression member 74 according to the second embodiment. FIG. 18 is a plan view showing the cap 72 provided with the suppression member 74 according to the second embodiment.

The suppression member 74 is provided along a direction from the air supply port 72NA to the air discharge port 72EA (in the present embodiment, the front-and-rear direction). Specifically, the suppression member 74 is a rectangular plate-like member whose longitudinal direction is along the direction from the air supply port 72NA to the air discharge port 72EA. The suppression member 74 is supported by posts 72P provided on the bottom portion 72B of the cap 72. The rear end portion of the suppression member 74 is disposed above the air supply port 72NA. The front end portion of the suppression member 74 is located on the rear side of the air discharge port 72EA. The first gap G1 is provided between the air supply port 72NA and the lower surface of the suppression member 74. The second gap G2 is provided between the nozzle surface 14F and the upper surface of the suppression member 74.

The suppression member 74 is provided with a through-hole 74H penetrating from the side of the air supply port 72NA to the side of the nozzle surface 14F at a position not facing the air supply port 72NA. The through-hole 74H is provided at a plurality of positions (in this embodiment, three) along the front-and-rear direction.

A part WA1 (see FIG. 15) of the humidified air flowing into the cap 72 from the air supply port 72NA flows forward through the first gap G1, and is sucked into the air discharge port 72EA. Another part WA2 of the humidified air WA2 flows from the first gap G1 to the second gap G2 via the rear side of the suppression member 74, flows forward through the second gap G2, and is sucked into the air discharge port 72EA. Another part WA3 of the humidified air WA3 (see FIG. 16) flows forward through the left and right spaces of the suppression member 73, and is sucked into the air discharge port 72EA. That is, since the humidified air WA flows along the lower and upper surfaces of the suppression member 74 over a wider area than in the first embodiment, it is possible to supply the humidified air WA over a wider area than in the first embodiment.

A part WA4 of the humidified air flowing through the first gap G1 to the air discharge port 72EA flows through the through-holes 74H from the first gap G1 to the second gap G2, so that the insufficient supply of the humidified air WA by the suppression member 74 can be compensated. Further, the humidified air WA is also supplied to the nozzle surface 14F separated from the air supply port 72NA through the through-holes 74H, so that the uniformity of the humidification to the nozzle surface 14F is improved.

According to the maintenance device 30 according to the embodiment described above, the cap 72 includes the air discharge port 72EA, and the suppression member 74 is provided along the direction from the air supply port 72NA to the air discharge port 72EA. According to this embodiment, it is possible to supply the humidified air WA over a wide area along the direction from the air supply port 72NA to the air discharge port 72EA.

According to the maintenance device 30 according to the present embodiment, the suppression member 74 has the through-holes 74H penetrating from the side of the air supply port 72NA to the side of the nozzle surface 14F at a position not facing the air supply port 72NA. According to this embodiment, an insufficient supply of the humidified air WA by the suppression member 74 can be compensated.

According to the maintenance device 30 according to the present embodiment, the cap 72 includes the air discharge port 72EA, and the through-hole 74H is provided at a plurality of positions along the direction from the side of the air supply port 72NA to the side of the air discharge port 72EA. According to this embodiment, the uniformity of the humidification to the nozzle surface 14F can be improved.

[Third Embodiment] In the second embodiment (see FIG. 17), since the end portion of the suppression member 74 on the side of the air discharge port 72EA is positioned on the rear side of the air discharge port 72EA, there is a problem that the humidified air WA is hardly supplied to the region R in front of the end portion of the suppression member 74 on the side of the air discharge port 72 EA.

Figure 19:
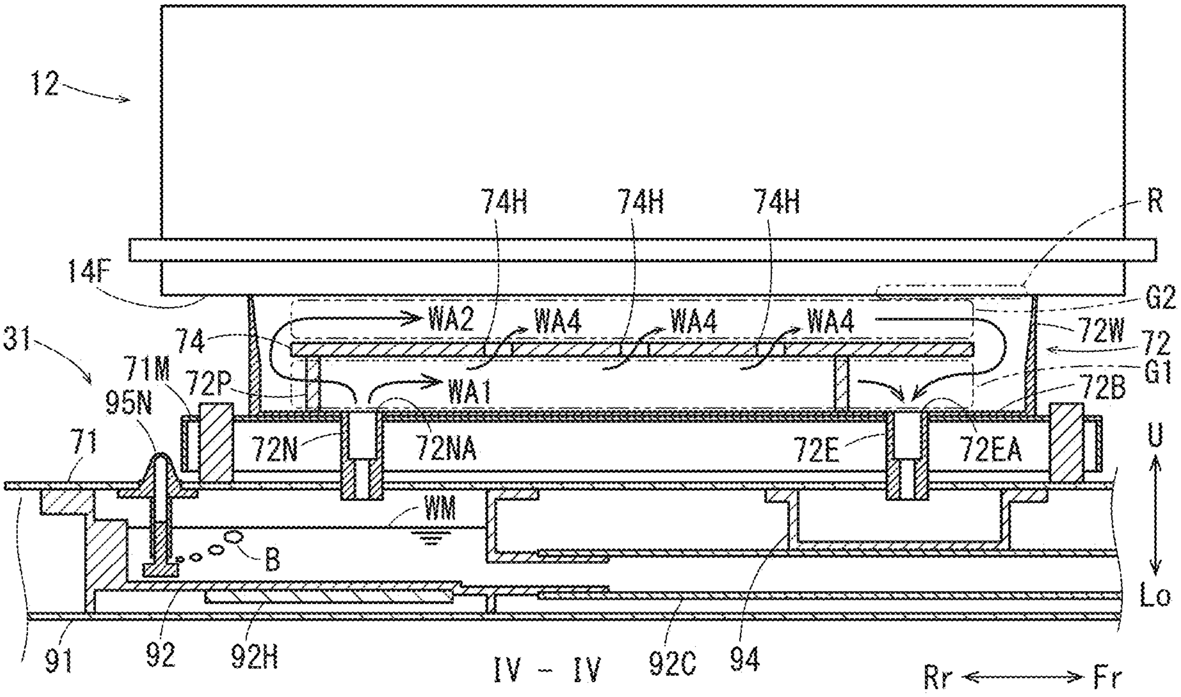
FIG. 19 is a cross-sectional view showing the cap unit provided with the suppression member according to a third embodiment of the present disclosure.
Figure 20:
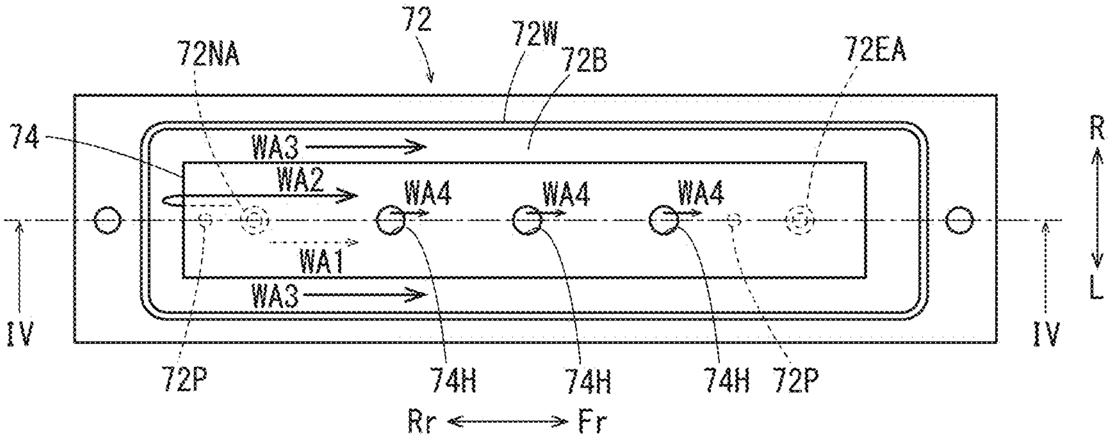
FIG. 20 is a plan view showing the cap provided with the suppression member according to the third embodiment of the present disclosure.

FIG. 19 is a cross-sectional view showing the cap unit 31 including the suppression member 74 according to the third embodiment. FIG. 20 is a plan view showing the cap 72 including the suppression member 74 according to the third embodiment.

In this embodiment, the end portion of the suppression member 74 on the side of the air discharge port 72EA faces the air discharge port 72EA. According to the present embodiment, the humidified air WA flowing forward through the second gap G2 flows from the front side of the suppression member 74 to the first gap G1, and is sucked into the air discharge port 72EA, so that the humidified air WA can also be supplied to the nozzle surface 14F on the side of the air discharge port 72EA. Therefore, according to the present embodiment, the uniformity of humidification with respect to the nozzle surface 14F can be improved.

[Fourth Embodiment] The ink may fall on the upper surface of the suppression member 74. For example, the ink may fall when the purge processing is performed due to an erroneous operation while the cap 72 is attached on the nozzle surface 14F, or when the ink remains on the nozzle surface 14F after the wipe processing due to an error in the positioning of the wipe unit 32 in the upper-and-lower direction. In the second and third embodiments, when the fallen ink flows into the through-holes 74H, there is a possibility that the through-holes 74H are clogged and the humidified air WA is difficult to pass through. Therefore, in the present embodiment, the upper surface of the suppression member 74 is provided with a recess 74A which is recessed deeper than the edge portions 74HE of the through-holes 74H.

Figure 21:
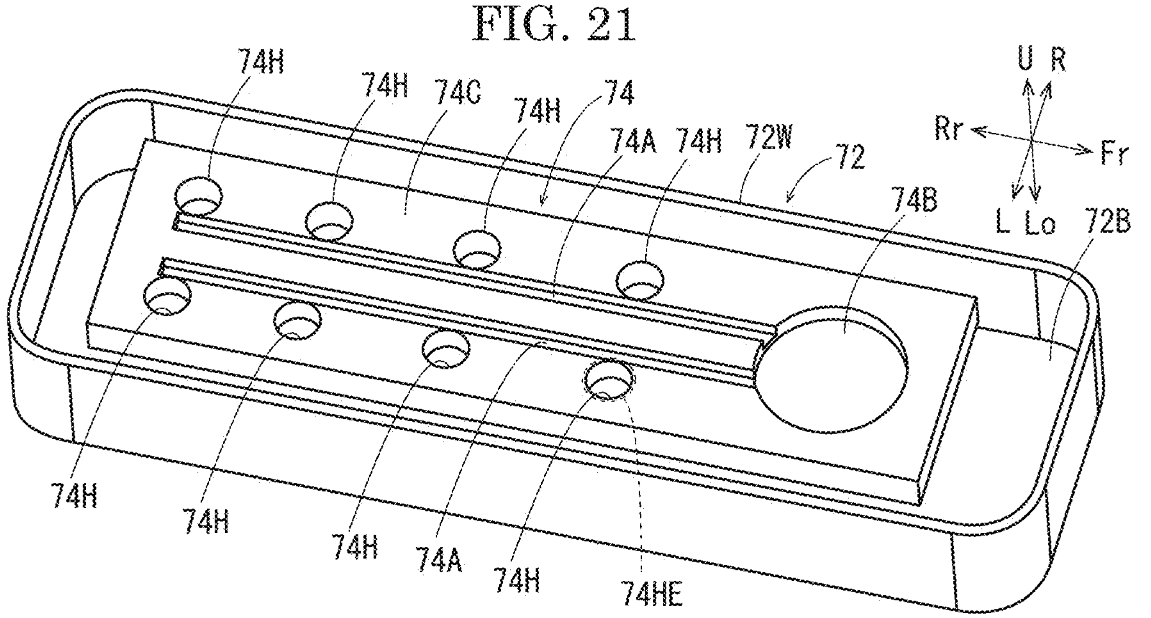
FIG. 21 is a cross-sectional view showing the cap unit provided with the suppression member according to a fourth embodiment of the present disclosure.
Figure 22:
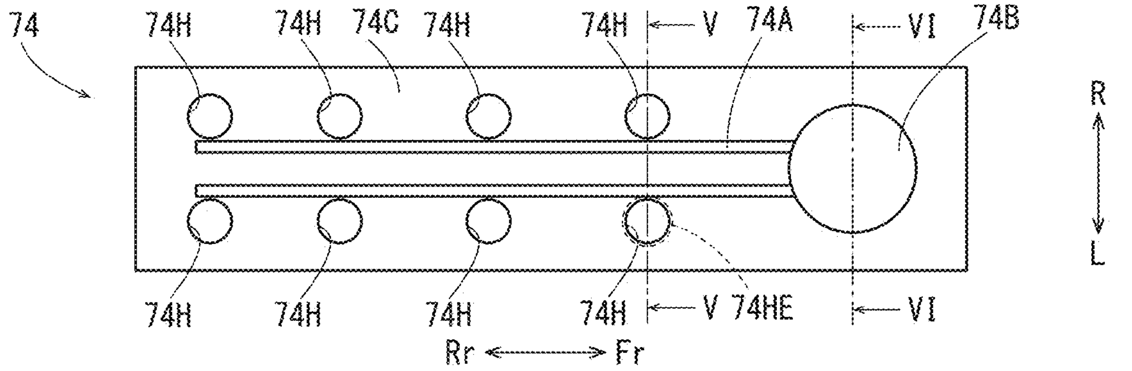
FIG. 22 is a plan view showing the cap provided with the suppression member according to the fourth embodiment of the present disclosure.
Figure 23:
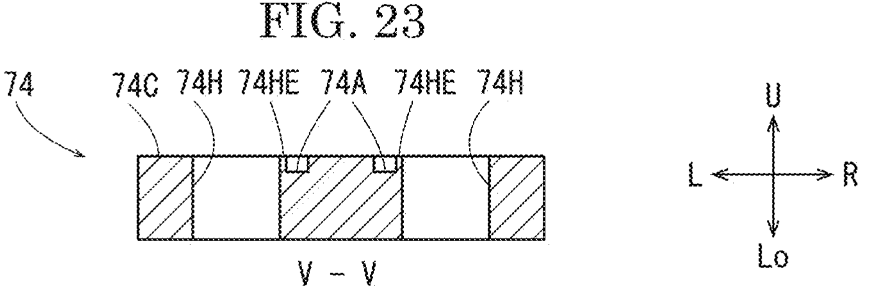
FIG. 23 is a cross-sectional view taken along the line V-V of FIG. 22.
Figure 24:
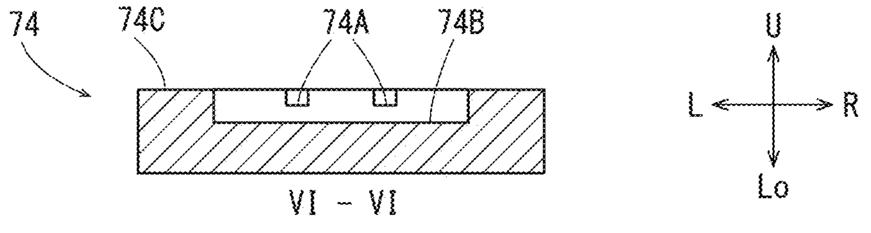
FIG. 24 is a cross-sectional view taken along the line VI-VI of FIG. 22.

FIG. 21 is a perspective view showing the cap 72 with the suppression member 74. FIG. 22 is a plan view showing the suppression member 74. FIG. 23 is a cross-sectional view taken along the line V-V of FIG. 22. FIG. 24 is a cross-sectional view taken along the line VI-VI of FIG. 22.

The through-hole 74H (see FIG. 21, FIG. 22) is provided at a plurality of positions (in this embodiment, four positions) along a direction from the side of the air supply port 72NA to the side of the air discharge port 72EA (in this embodiment, the front-and-rear direction). A plurality of rows (in this embodiment, two rows) of the through-holes 74H are arranged along the front-and-rear direction.

The recess 74A (see FIG. 21, FIG. 22) is formed in a groove shape along the front-and-rear direction. The recesses 74A are arranged between the rows of the through-holes 74H. In this embodiment, two recesses 74A are arranged between two rows of the through-holes 74H.

A portion of the upper surface of the suppression member 74 excluding the through-holes 74H, the recesses 74A, and a storage 74B is substantially horizontal, and this portion is called a horizontal portion 74C. The edge portion 74HE (see FIG. 21 to FIG. 23) of the through-hole 74H is a part of the horizontal portion 74C. The recess 74A is recessed deeper than the edge portion 74HE of the through-hole 74H.

The suppression member 74 includes the storage 74B in which the liquid flowing along the recesses 74A is stored. The storage 74B is provided on the upper surface of the suppression member 74, and is formed deeper than the recesses 74A. The storage 74B is formed in a generally circular shape when viewed from the upper side. The storage 74B is continuous with two recesses 74A. As an example, in the present embodiment, the storage 74B is continuous with the front ends of two recesses 74A.

Next, a behavior of the ink fallen from the nozzle surface 14F to the suppression member 74 will be described. As shown in FIG. 21, since the horizontal portion 74C occupies most of the upper surface, most of the ink falls into the horizontal portion 74C, and the other ink falls directly into the through-holes 74H, the recesses 74A, and the storage 74B.

Since the ink fallen on the horizontal portion 74C is shaken by vibration and air flow inside the inkjet recording apparatus 1, the ink in the vicinity of the through-holes 74H, the recesses 74A, and the storage 74B flows into the through-holes 74H, the recesses 74A, and the storage 74B, respectively. When the ink flows into the recesses 74A, the ink is further drawn into the recesses 74A from the horizontal portion 74C by surface tension. The ink flowing into the through-holes 74H falls on the cap 72, while the ink fallen in the recesses 74A and the storage 74B stays in the recesses 74A and the storage 74B, respectively. Since the storage 74B is deeper than the recesses 74A, the ink stayed in the recesses 74A gradually flows down to the storage 74B. Thus, a part of the ink fallen on the upper surface of the suppression member 74 flows into the recesses 74A and the storage 74B, so that the inflow of the ink into the through-holes 74H is reduced, and the through-holes 74H are hardly clogged. Therefore, the supply of the humidified air WA to the nozzle surface 14F can be stabilized.

The maintenance device 30 according to the present embodiment described above includes the cap 72 attached on the nozzle surface 14F of the inkjet head 12, the air supply port 72NA provided in the cap 72, and the suppression member 74 provided at least between the air supply port 72NA and the nozzle face 14F, having the first gap G1 from the air supply port 72NA and the second gap G2 from the nozzle surface 14F, wherein the suppression member 74 is provided with one or more through-holes 74H provided at a position not facing the air supply port 72NA of the suppression member 74 and penetrating from the side of the air supply port 72NA to the side of the nozzle surface 14F, and the recess 74A provided on the upper surface of the suppression member 74 and recessed deeper than the edge portion 74HE of the through-hole 74H. According to this configuration, since a part of the ink fallen on the upper surface of the suppression member 74 flows into the recess 74A, the inflow of the ink into the through-hole 74H is reduced, and the through-hole 74H is hardly clogged. Therefore, the supply of the humidified air WA to the nozzle surface 14F can be stabilized.

According to the maintenance device 30 according to the present embodiment, the cap 72 includes the air discharge port 72EA, the through-hole 74H is provided at a plurality of positions along the direction from the side of the air supply port 72NA to the side of the air discharge port 72EA, and the recess 74A is formed in a groove shape along the direction from the side of the air supply port 72NA to the side of the air discharge port 72EA. According to this configuration, it is possible to uniformly supply the humidified air WA in the direction from the side of the air supply port 72NA to the side of the air discharge port 72EA. Further, even if a number of the through-holes 74H is increased, the ink easily flows into the recess 74A.

According to the maintenance device 30 according to the present embodiment, a plurality of rows of the through-holes 74H are arranged along the direction from the side of the air supply port 72NA to the side of air discharge port 72EA, and the recess 74A is arranged between the rows of the through-holes 74H. According to this configuration, it is possible to uniformly supply the humidified air WA in the direction intersecting the direction from the side of the air supply port 72NA to the side of the air discharge port 72EA. Further, even if the rows of the through-holes 74H are increased, the ink can easily flow into the recess 74A.

In addition, according to the maintenance device 30 according to the present embodiment, two recesses 74A are arranged between two rows of the through-holes 74H. According to this configuration, the ink hardly falls in the vicinity of the through-holes 74H by disposing two rows of the through-holes 74H apart from each other. In addition, the ink fallen between two rows of the through-holes 74H easily flows into the recess 74A.

In addition, according to the maintenance device 30 according to the present embodiment, the storage 74B for storing the liquid flowing along the recess 74A is provided. According to this configuration, the ink hardly overflows from the recess 74A.

According to the maintenance device 30 according to the present embodiment, the storage 74B is provided on the upper surface of the suppression member 74, and is formed deeper than the recess 74A. According to this configuration, the discharge of the ink from the recess 74A to the storage 74B is promoted, so that the ink hardly overflows from the recess 74A.

[Modified Example of Fourth Embodiment] The fourth embodiment may be modified as follows.

Figure 25:
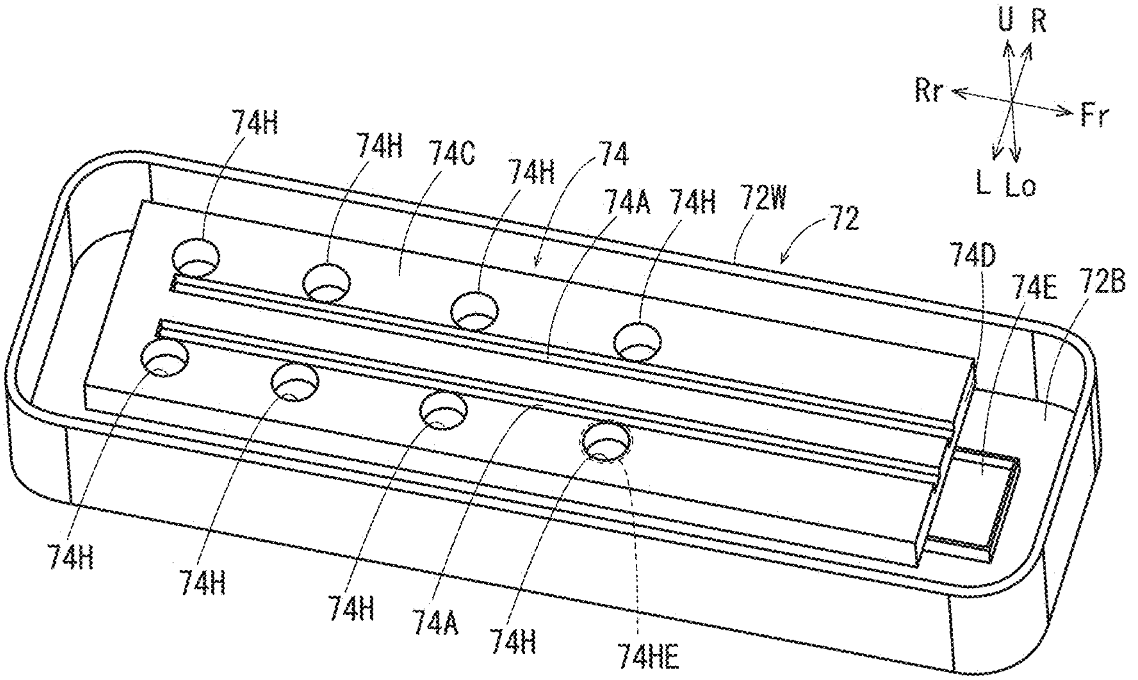
FIG. 25 is a perspective view showing the cap provided with the suppression member according to a first modified example of the fourth embodiment of the present disclosure.

[First Modified Example] FIG. 25 is a perspective view showing the cap 72 with the suppression member 74. In this modified example, at least one end portion (in FIG. 25, the front end portion) of the recess 74A penetrates the end surface 74D of the suppression member 74, and the storage 74E is provided at the bottom portion 72B of the cap 72. The storage 74E is provided below the front end portion of the recess 74A, and is formed in a box-like shape opened upward. The ink remaining in the recesses 74A flows from the front end portion of the recesses 74A to the storage 74E. According to this configuration, the discharge of the ink from the recesses 74A to the storage 74E is promoted, so that the ink hardly overflows from the recess 74A. Further, since the upper surface of the suppression member 74 has less unevenness, turbulence in the air flow of the humidified air WA can be suppressed.

Figure 26:
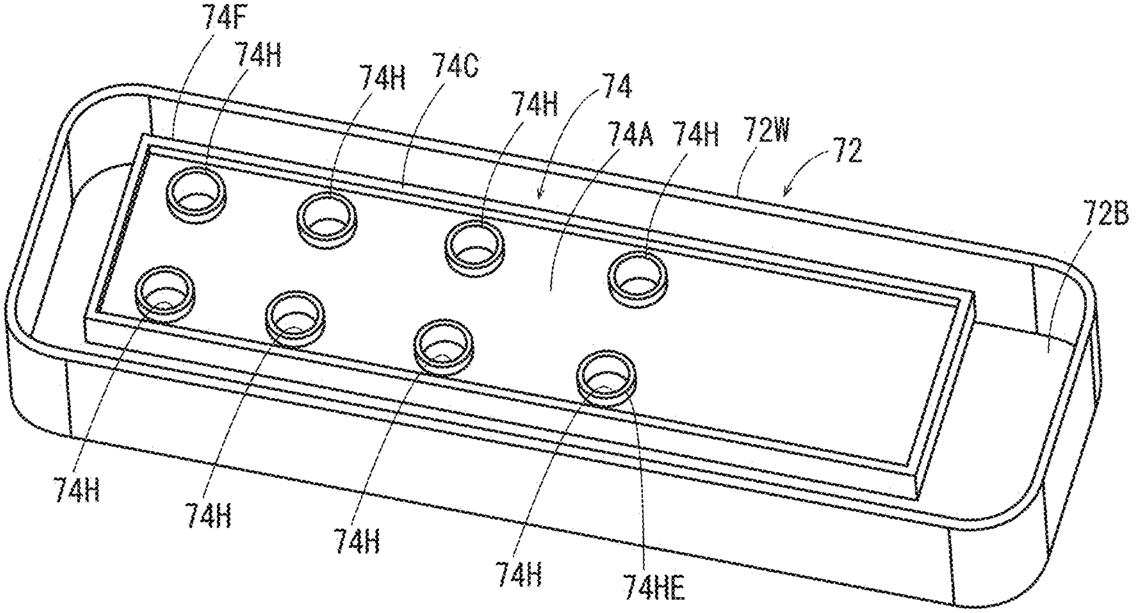
FIG. 26 is a perspective view showing the cap provided with the suppression member according to a second modified example of the fourth embodiment of the present disclosure.

[Second Modified Example] FIG. 26 is a perspective view showing the cap 72 with the suppression member 74. In this modified example, the recesses 74A are formed on a portion of the upper surface of the suppression member 74 excluding the edge portion 74F of the upper surface and the edge portions 74HE of the through-holes 74H. According to this configuration, since most of the ink fallen on the suppression member 74 falls into the recesses 74A, the inflow of the ink into the through-holes 74H is reduced, and the through-holes 74H are hardly clogged. Therefore, the supply of the humidified air WA to the nozzle surface 14F can be stabilized.

Figure 27:
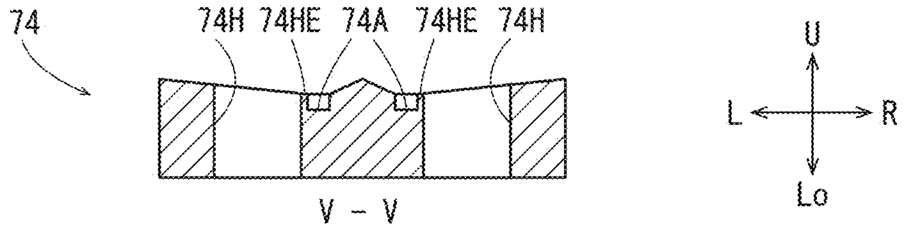
FIG. 27 is a perspective view showing the cap provided with the suppression member according to a third modified example of the fourth embodiment of the present disclosure.

[Third Modified Example] FIG. 27 is a cross-sectional view showing the suppression member 74. In this modified example, surface of the suppression member 74 is inclined so that the side of the recesses 74A is lowered in the direction (in this embodiment, the left-and-right direction) intersecting the direction (in this embodiment, the front-and-rear direction) from side of the air supply port 72NA to the side of the air discharge port 72EA. With this configuration, the ink fallen on the upper surface of the suppression member 74 easily flows into the recesses 74A.

[Fourth Modified Example] In addition to the above configuration, the bottom of the recess 74A may be inclined in the longitudinal direction of the recess 74A (not shown). For example, in the fourth embodiment, the bottom of the recess 74A may be inclined so that the side of the storage 74B is lowered. In the first modified example, the bottom of the recess 74A may be inclined so that the side of the storage 74E is lowered. In the second modified example, the storage 74E similar to that in the first modified example may be provided, a notch may be provided at the upper edge portion 74F of the storage 74E, and the bottom of the recess 74A may be inclined so that the side of the storage 74E is lowered. According to these configurations, the discharge of the ink from the recesses 74A to the storage 74B and 74E is promoted, so that the ink hardly overflows from the recesses 74A.

The invention claimed is:

1. A maintenance device comprising:

a cap which is attached to a nozzle surface of an inkjet head;

an air supply port which is provided in the cap; and a suppression member which is provided between the air supply port and the nozzle surface, and has a first gap from the air supply port and a second gap from the nozzle surface, wherein the suppression member has one or more through-holes which are provided in a position not facing the air supply port of the suppression member, and penetrate from a side of the air supply port to a side of the nozzle surface, and a recess which is provided on an upper surface of the suppression member and recessed deeper than an edge portion of the through-hole.

2. The maintenance device according to claim 1, wherein the cap includes an air discharge port, and the through-holes are provided at a plurality of positions along a direction from the side of the air supply port to the side of the air discharge port, and the recess is formed to be a groove-shape along the direction from the side of the air supply port to the side of the air discharge port.

3. The maintenance device according to claim 1, wherein a plurality of rows of the through-holes are arranged along the direction of the side of the air supply port to the side of the air discharge port, and the recess is arranged between the rows of the through-holes.

4. The maintenance device according to claim 3, wherein two of the recesses are disposed between the two rows of the through-holes.

5. The maintenance device according to claim 3, comprising:

a storage in which a liquid flowing along the recess is stored.

6. The maintenance device according to claim 5, wherein the storage is provided on the upper surface of the suppression member, and is deeper than the recess.

7. The maintenance device according to claim 5, wherein at least one end portion of the recess penetrates an end surface of the suppression member, and the storage is provided on a bottom of the recess.

8. An inkjet recording apparatus comprising:

the inkjet head, and the maintenance device according to claim 1.

* * * * *